United States Patent
Reyes Martinez et al.

(10) Patent No.: US 10,896,218 B2
(45) Date of Patent: Jan. 19, 2021

(54) COMPUTERIZED GEO-REFERENCING FOR IMAGES

(71) Applicant: ORACLE INTERNATIONAL CORPORATION, Redwood Shores, CA (US)

(72) Inventors: Juan Carlos Reyes Martinez, Zapopan (MX); David Esparza Alba, Zapopan (MX); Roberto Infante Suarez, Zapopan (MX); Siva K. Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 291 days.

(21) Appl. No.: 15/851,840

(22) Filed: Dec. 22, 2017

(65) Prior Publication Data
US 2019/0197134 A1    Jun. 27, 2019

(51) Int. Cl.
| | | |
|---|---|---|
| *G06F 7/00* | (2006.01) | |
| *G06F 16/56* | (2019.01) | |
| *G06F 16/51* | (2019.01) | |
| *G06F 16/58* | (2019.01) | |
| *G06F 16/901* | (2019.01) | |
| *G06F 16/587* | (2019.01) | |

(52) U.S. Cl.
CPC .............. *G06F 16/56* (2019.01); *G06F 16/51* (2019.01); *G06F 16/587* (2019.01); *G06F 16/5866* (2019.01); *G06F 16/9024* (2019.01)

(58) Field of Classification Search
CPC ...... G06F 16/29; G06F 16/433; G06F 16/532; G06F 16/2237; G06F 16/5854; G06F 16/355
See application file for complete search history.

(56) References Cited

U.S. PATENT DOCUMENTS

| | | | | |
|---|---|---|---|---|
| 7,379,627 B2 * | 5/2008 | Li | .................. | G06K 9/4652 |
| | | | | 382/305 |
| 8,031,948 B2 | 10/2011 | Liu et al. | | |
| 8,260,006 B1 * | 9/2012 | Callari | ............... | G06K 9/00973 |
| | | | | 382/113 |

(Continued)

OTHER PUBLICATIONS

Ujaval Gandhi; Georeferencing Topo Sheets and Scanned Maps; 2016; pp. 1-11; downloaded on Oct. 17, 2017 from: http://www.qgistutorials.com/es/docs/georeferencing_basics.html.

(Continued)

*Primary Examiner* — Daniel A Kuddus
(74) *Attorney, Agent, or Firm* — Kraguljac Law Group, LLC

(57) ABSTRACT

Systems, methods, and other embodiments associated with computerized geo-referencing of images are described. In one embodiment, a method includes extracting features from an image of a location. The method includes determining similarities between the extracted features and known features within vector data for the location. The method includes generating a data structure based upon the similarities. The method includes processing the similarities to identify a match between an extracted feature and a known feature. The method includes assigning geo-location data from the vector data for the known feature to the extracted feature. The method includes identifying a position of an object within the location using the geo-location data.

18 Claims, 14 Drawing Sheets

(56) References Cited

U.S. PATENT DOCUMENTS

| | | | |
|---|---|---|---|
| 8,660,383 B1* | 2/2014 | Callari | G06K 9/00973 |
| | | | 382/294 |
| 8,761,457 B1 | 6/2014 | Seitz et al. | |
| 9,208,171 B1* | 12/2015 | Cotting | G06F 16/58 |
| 9,330,341 B2* | 5/2016 | Deng | G06F 16/5866 |
| 10,089,712 B2 | 10/2018 | Misra et al. | |
| 2006/0101060 A1* | 5/2006 | Li | G06F 16/583 |
| 2009/0150373 A1* | 6/2009 | Davis | G11B 27/105 |
| 2009/0150376 A1* | 6/2009 | O'Callaghan | G06F 16/5838 |
| 2014/0068439 A1* | 3/2014 | Lacaze | G06F 3/0484 |
| | | | 715/720 |
| 2014/0362174 A1* | 12/2014 | Fan | G06T 17/05 |
| | | | 348/36 |
| 2015/0161476 A1* | 6/2015 | Kurz | G06K 9/6202 |
| | | | 382/190 |
| 2015/0199556 A1* | 7/2015 | Qian | G06T 7/74 |
| | | | 382/215 |
| 2015/0283217 A1* | 10/2015 | Shi | C12Y 304/24027 |
| | | | 424/94.67 |
| 2015/0286217 A1* | 10/2015 | Qian | G01S 5/16 |
| | | | 382/104 |
| 2016/0026253 A1* | 1/2016 | Bradski | H04N 13/344 |
| | | | 345/8 |
| 2016/0086047 A1* | 3/2016 | Suh | G06K 9/6247 |
| | | | 382/159 |
| 2016/0307373 A1* | 10/2016 | Dean | G06T 19/006 |
| 2017/0084037 A1* | 3/2017 | Barajas Hernandez | |
| | | | G06K 9/00637 |
| 2018/0096451 A1 | 4/2018 | Misra et al. | |

OTHER PUBLICATIONS

How to Georeference an Image Using ArcGIS; pp. 1-2; downloaded on Oct. 17, 2017 from: http://gpshort.uga.edu/instructions/GIS_Georeference%20an%20image%20using%20ArcGIS.pdf.

Georeferencing Pointclouds; pp. 1-4; downloaded on Oct. 17, 2017 from: https://community.topoi.org/documents/95181/583855/Georeferencing_BT_Pointclouds.pdf/55ebd4c8-6dc5-4bc2-87b4-ac758132a2cc.

Grass-Wiki; Georeferencing; pp. 1-2; downloaded on Oct. 17, 2017 from: http://grasswiki.osgeo.org/wiki/Georeferencing.

Creative Commons Attribution-Sharealike; Georeferencer Plugin; pp. 1-5; downloaded on Oct. 17, 2017 from: http://docs.qgis.org/1.8/en/docs/user_manual/plugins/plugins_georeferencer.html.

ESRI; How to: Georeference an image to align with other data; pp. 1-2; downloaded on Oct. 17, 2017 from: http://support.esri.com/technical-article/000008595.

Global Mapper; Global Mapper-Users Manual; pp. 1-4; downloaded on Oct. 17, 2017 from: http://www.globalmapper.com/helpv9/Help_ImageRectification.html.

Matt Kenny-Blog; MetaCarta's Map Rectifier + ESRI DevSummit Mashup Winner; pp. 1-2; downloaded on Oct. 17, 2017 from: http://mattmakesmaps.com/blog/2009/04/08/metacartas-map-rectifier-esri-devsummit-mashup-winner/.

Mapwarper; Maptimelex / Mapwarper; pp. 1-3; downloaded on Oct. 17, 2017 from: https://github.com/maptimelex/mapwarper.

Mapwarper; Map Warper—Home; pp. 1-4; downloaded on Oct. 17, 2017 from: http://mapwarper.net/.

Mapperz; Mapperz—The Mapping News Blog; pp. 1-3; downloaded on Oct. 17, 2017 from: http://mapperz.blogspot.com/2007/09/yahoo-mapmixer-quick-user-guide.html.

Lifehacker; Merge Your Map on Yahoo Maps with MapMixer; pp. 1-2; downloaded on Oct. 17, 2017 from: http://lifehacker.com/299391/merge-your-map-on-yahoo-maps-with-mapmixer.

Geo-Spatial.org; EHarta—a geo-spatial.org collaborative project; pp. 1-3; downloaded on Oct. 17, 2017 from: http://www.geo-spatial.org/articole/eHarta?lang=en.

Elson et al.; MapCruncher: Integrating the World's Geographic Information; pp. 1-10; downloaded on Oct. 17, 2017 from: https://www.microsoft.com/en-us/research/wp-content/uploads/2007/04/OSR2007-4b.pdf.

* cited by examiner

COMPUTERIZED GEO-REFERENCING FOR IMAGES

BACKGROUND

Many entities such as users, companies, and organizations capture images of locations for various purposes. For example, a tree farm may capture images of orchards in order to identify sick trees that will need human intervention to address the sickness. These images can include aerial photography, thermal images, infrared images, or other types of imagery. In some instances, the images can include geo-location data such as longitude and latitude information for an image. The geo-location data can be collected by various types of equipment during capture of the images, such as location tracking equipment within an airplane that is capturing aerial photography of the farm. The geo-location data can be used to identify real-world locations of objects depicted within an image, such as a longitude and latitude information of a sick tree. In other instances, the images lack geo-reference location data, thus may provide little help in identifying real-world locations of objects depicted within such images.

Unfortunately, geo-location data is often approximate and/or inaccurate. Such inaccuracies can result from imprecise equipment, incorrectly calibrated equipment, malfunctioning equipment, etc. Thus, geo-location data for a sick tree can be off anywhere from centimeters to meters. If the inaccuracy is large enough, then the tree farm could send an arborist to the wrong tree for evaluation and treatment. This can become especially problematic for very large locations with many similar objects.

Manual intervention is required for attempting to address incorrect geo-reference information. For every image, a user must manually figure out a set of entry points for a location depicted by the image. The entry points are used to set reference points for the image. Such manual human intervention is cumbersome, time consuming, error prone, and wastes computing resources, which becomes even more problematic when a large number of images are to be processed.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
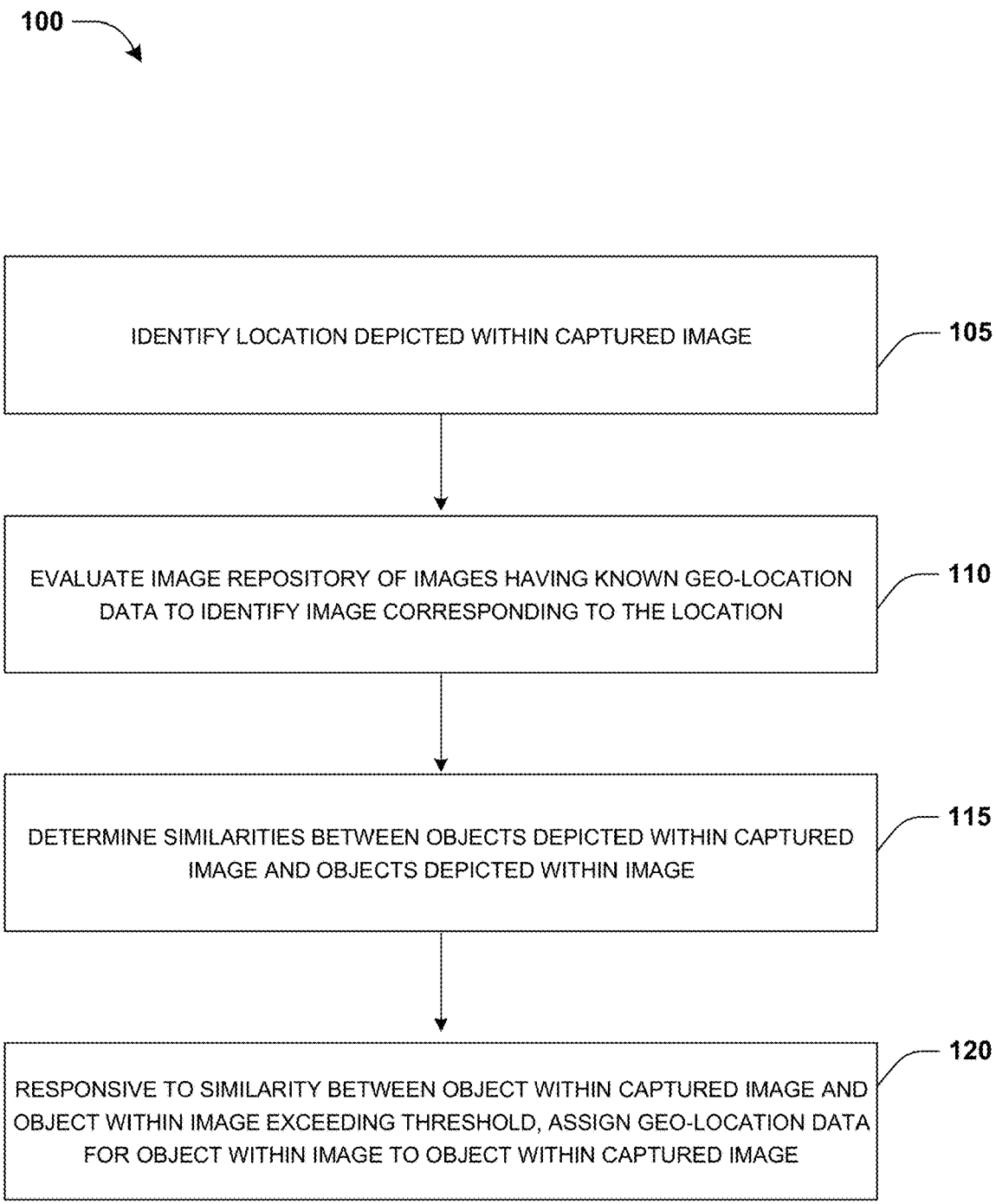
FIG. 1 illustrates an embodiment of a method associated with computerized geo-referencing for images.

Computerized systems and methods are described herein that provide for computerized geo-referencing for images. In particular, a geo-referencing module is configured to perform automated geo-referencing for an image. Automated geo-referencing is a technique for verifying, modifying, or creating new geo-location data for images. A geo-location corresponds to location information of an object, such as longitude and latitude information for a building depicted in an image. Geo-location data for the object can be calculated by locational equipment during capture of an image that includes the object, and can be associated with the image as geo-reference metadata. In one embodiment, during a capture process of the image such as during aerial photography from an airplane, instrumentation used to obtain geo-location data for the image can end up collecting imprecise or inaccurate geo-location data. This inaccurate geo-location data is stored within the geo-reference metadata of the image. As will be described herein, in one embodiment, geo-location data within the geo-reference metadata is modified/updated by the geo-referencing module with more accurate geo-location data by using image segmentation techniques, graphs, matrixes, and/or spatial matching algorithms. In another embodiment where an image does not comprise geo-reference metadata, geo-location data is determined, generated and assigned as new geo-reference metadata for the image.

Performing computerized geo-referencing for the image improves the accuracy of geo-location data of objects depicted within the image. Improving the accuracy of geo-location data provides a technical solution to a technical problem of how to locate objects in the real-world. Longitude and latitude information within the more accurate geo-location data can be used to more precisely identify and locate objects, such as a particular sick tree in a tree farm. Otherwise, inaccurate geo-location data can lead to the inability to locate a target object. Thus, a wrong object may be mistakenly located, which can lead to actions being performed on the wrong object rather than on the target object. In the tree example, if a wrong tree is identified due to geo-location data being off by a few meters, then an action such as the manual evaluation of the wrong tree within the tree farm would occur.

In one embodiment, the present system is implemented to perform geo-referencing for images. The system improves upon previous geo-referencing processes because the system uses high precision known geo-location data within vector data that is maintained for multiple locations of a specified geographical area. For an image of a target location, the vector data is used to determine and assign the geo-location data to corresponding objects depicted within the image of the target location. In one embodiment, geo-referencing is performed automatically by the system using data matching techniques to reduce or eliminate additional input of data from users. This reduces manual human efforts used in prior techniques to identify reference points for a location so that the reference points can be used to adjust the geo-location data of an image. The prior techniques involve a process that is tedious, error prone, and consumes substantial amounts of computing resources such as where a large number of images are to be geo-referenced by human interaction through a computer for image processing.

Conversely, with the present system, the precision of identifying accurate geo-location data such as longitude and latitude information for objects in the real-world is improved. This provides a technical solution for a technical problem arising from inaccurate geo-location data measured by imprecise equipment, malfunctioning equipment, and/or equipment incorrectly calibrated. Thus, the more accurate geo-location data can be used, such as by a computer, to identify locations of target objects and initiate actions on the target objects. Example actions may include, but are not limited to, actions such as to dispatch equipment or a user to target locations to interface with target objects (e.g., a computer transmitting a dispatch command to a computing device of a utility worker for evaluating a particular malfunctioning transformer at a particular location).

In may be appreciated that various types of objects can be located using the techniques described herein, such as a mailbox within a downtown district, a picnic table within a park, a traffic light within a residential neighborhood, a utility pole, etc.

With reference to FIG. 1, one embodiment of a computer implemented method 100 associated with computerized geo-referencing for images is illustrated. In one embodiment, the method 100 is performed by a computer system including at least one processor that executes instructions from a memory and/or a storage device to process an input image as described herein. In the following example, presume that one or more digital photographic images have been captured and are available as input. In one embodiment, the input image is represented as raster data that is read and analyzed. For example, a photo of a national park may be captured from an airplane flying over the national park. Such captured photos may be captured weekly and inspected in order to identify potential problematic areas within the national park that need maintenance attention, such as litter cleanup, fallen tree removal, hiking trail safety, etc. Because the national park may be relatively large, it would be beneficial to identify precise geo-locations of objects depicted within the captured photos so that a park ranger or other personnel is not sent to the wrong location or wrong target object (e.g., the wrong tree, trail section, etc.).

Method 100 may initiate by identifying the captured image as input for evaluation. This may include a user selecting an image or providing a set of images to be evaluated. A location depicted within the captured image may be identified, at 105. In one embodiment, the location is specified within captured geo-location data associated with the captured image, such as longitude and latitude values measured using equipment in the airplane when the captured image was taken. Thus the system can parse attributes of the image to identify the geo-location data. In another embodiment, the captured image does not include geo-location data and a user may input the location such as in response to a prompt requesting location data for the captured image. In another embodiment, image recognition functionality may be used to identify the location depicted within the captured image, such as where the captured image depicts a unique national monument within the national park.

In one embodiment, an image repository may be maintained with reference images that have precise geo-location data for various locations/areas where the accuracy of the geo-location data was previously verified. Such reference images may have been created during a survey of the national park using high precision locational equipment. Thus, the geo-location data within the reference images maintained within the image repository may provide relatively precise longitude and latitude values for objects depicted within the reference images, such as locations of trees, campgrounds, trails, streams, etc. Because the captured image being evaluated may have imprecise geo-location data due to equipment malfunctions or incorrect calibrations of the equipment within the airplane or may lack geo-location data, geo-location data within the reference images from the image repository may be assigned to the captured image. In this way, the captured image will be associated with precise geo-location data for objects depicted within the captured image.

Accordingly the method at 110, the image repository of reference images having known geo-location data is evaluated to identify a reference image corresponding to the location depicted within the captured image. In one embodiment, since the image repository may have many reference images of many different areas, the reference images that correspond to the location of the input image are identified either by the user or from the image data itself. Thus, a subset of reference images (or vector data as will be described below) that have the same or nearby location as the input image location are designated and loaded. This identifies a limited reference data set for the system and reduces the amount of reference images analyzed to allow for more efficient analysis, rather than analyzing the entire image repository trying to find reference images that are relevant to the input image.

In one embodiment, the reference images within the image repository may be indexed by locations depicted by such images (e.g., images may be indexed or mapped to longitude and latitude values, such as longitude and latitude of a center location of an image). In this way, the location of the captured image, such as a longitude and latitude of a center location of the captured image, is used to query the image repository to identify the reference image having a similar longitude and latitude. The identified reference image is then retrieved from storage and used during the evaluation.

At 115, the processor determines similarities between objects depicted within the captured image and objects depicted within the reference image from the image repository. Example objects may include trees, signs, trail segments, parking lots, campgrounds, a fence, or other identifiable objects in a photograph. For example, a tree depicted within the captured image and a tree depicted within the image may be assign a similarity value corresponding to an amount of similarity between the trees, such as from similarities in shape, color, size, etc. In one embodiment, an object, such as litter, may be depicted within the captured image but does not appear in the reference image. In another embodiment, an object may be depicted within the reference image but does not appear in the captured image, such as a tree that was removed after the reference image was taken but before the captured image was taken. Such objects may have similarity values of zero or some other value to indicate a lack of a matching object in the other image. Thus, a same or different number of objects may be identified within respective images.

At 120, a determination is made that a similarity between an object within the captured image and an object within the reference image from the image repository exceeds a threshold, thus indicating that the two objects are the same object. The process is repeated for other objects in the captured image. Thus, multiple objects are extracted from the captured image, which become an input set of objects. In one embodiment, an image segmentation technique that is known can be used to process the image data to locate objects and boundaries in the image. The input set of objects are then compared to the known objects from the reference image to determine which objects are similar and match. In one embodiment, the similarity between objects (or other defined polygons between objects) is determined by using a similarity algorithm or matching algorithm as described with reference to FIGS. 2-4. In one embodiment, a matrix of similarity weights, as described in FIG. 2 matrix 245 or FIG. 4E matrix 445, and the corresponding process are used to compare two objects. For example, based at least on the similarity weight between a first object in the captured image to a second object in the reference image, the system determines that the first object is the same object as the second object or not, based on a set threshold value.

If the system determines that an object from the captured image is similar to an object in the reference image, then the geo-location data for the object in the captured image is updated. Accordingly, geo-location data for the object within the reference image is assigned to the object within the captured image. For example if the object is a tree, relatively precise longitude and latitude values for the tree within the reference image is assigned to the tree within the captured image. In this way, geo-location data of objects within the reference image are assigned to corresponding objects within the captured image based upon objects having similarities exceeding the threshold. Thus the geo-location data in the captured image is updated and the resulting captured image now has more precise geo-location data for the objects within the image.

In one embodiment, a difference between geo-location data of the object within the captured image and geo-location data of the object within the reference image can be determined. The difference, such as an offset, can be used to assign geo-location data to other objects within the captured image, such as objects depicted within the captured image but not within the reference image from the image repository.

Figure 2:
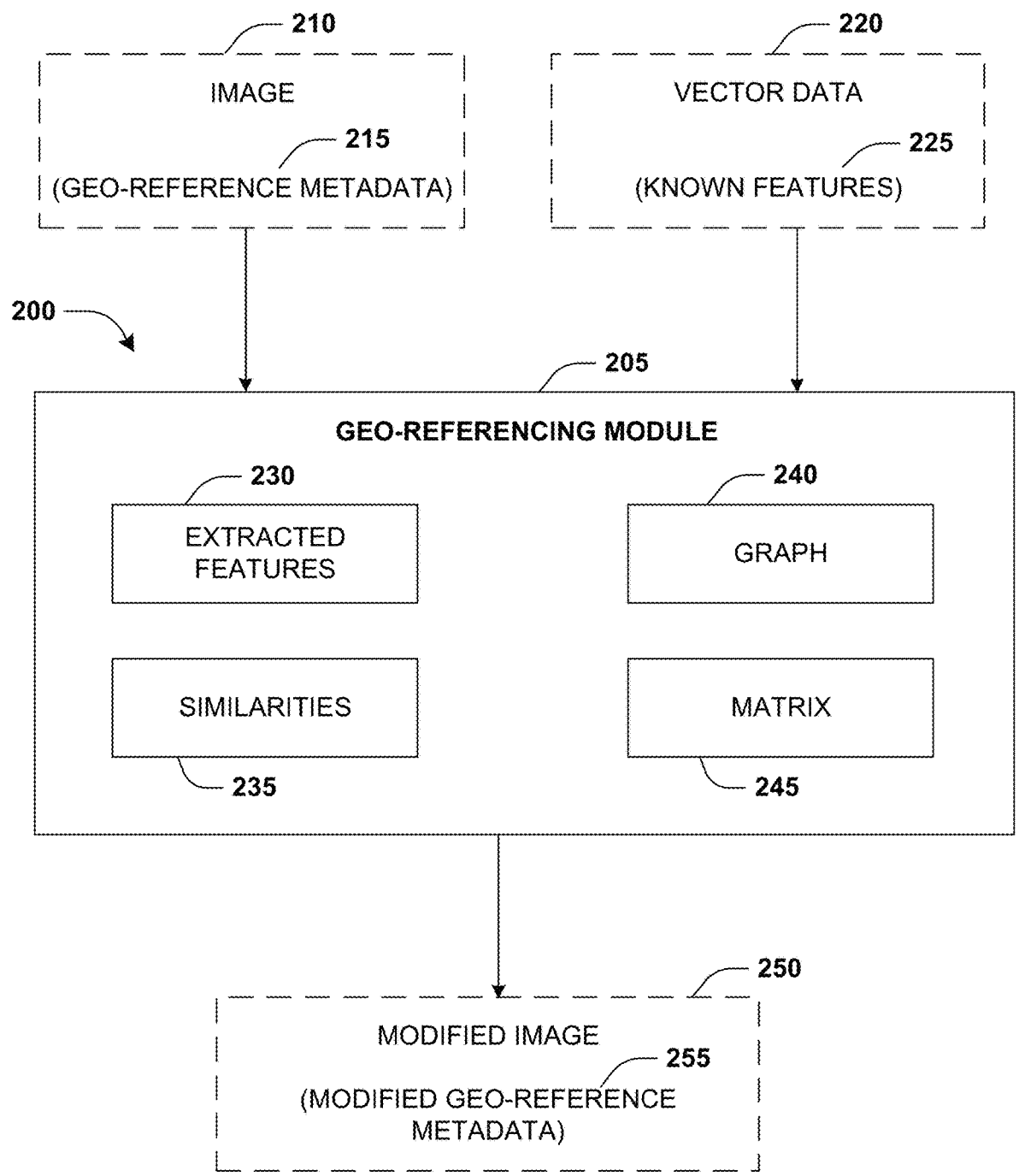
FIG. 2 illustrates an embodiment of a system associated with computerized geo-referencing for images.

With reference to FIG. 2, one embodiment of a computer system 200 associated with computerized geo-referencing for images is illustrated. The computer system 200 includes a geo-referencing module 205, which can be configured to execute on a computer, such as computer 615 of FIG. 6. The geo-referencing module 205 is configured to perform computerized and/or automated geo-referencing for images, such as images that lack geo-reference metadata or images that comprise geo-reference metadata that may be imprecise or inaccurate. In this way, geo-referencing can be performed for a variety of different types of images, such as aerial photography, thermal images, infrared images, etc.

In one embodiment, the geo-referencing module 205 performs computerized geo-referencing for an input image 210 that uses a set of known vector features (from known reference images) to georeference a series of features extracted from the input image 210. In one embodiment, the module 205 is configured to find a best match between the extracted features from the input image 210 and the reference vector features using graph algorithms and image segmentation techniques.

In one embodiment, image 210 may comprise an aerial photo depicting a geographic location, for example a tree farm. The image 210 may be associated with geo-reference metadata 215 comprising geo-location data, such as longitude and latitude values calculated by locational equipment used during capture of the image 210. Because the geo-reference metadata 215 could comprise inaccurate geo-location data of objects depicted within the image 210, the geo-referencing module 205 performs computerized geo-referencing for the image 210 to verify, modify, or create new geo-location data.

In order to perform computerized geo-referencing for the image 210, the geo-referencing module 205 determines the location of the image in order to identify a relevant set of one or more reference images that correspond to the location. The location may be determined from the input image 210 itself if the image includes metadata that indicates the location (e.g., identifies a city/state of the image). If the location is not available from the image 210, then the module 205 can request a user to identify the location. Then the reference image(s) and its corresponding vector data for that location is loaded and used for comparison.

Thus, the system 200 initially loads vector georeferenced features from the reference image that is used for georeferencing. For example, if a user wants to georeference images with farms/fields from Texas, the user will identify the location/region to the system 200. The system 200 will locate and retrieve vector data 220 and reference images from the image repository that correspond to Texas fields and load the reference images for processing. Thus the system 200 expects to process reference images that are limited to the region of interest so that the algorithm is processing, in this example, images from Texas fields, and not random images from locations unrelated to the input image.

The geo-referencing module 205 is configured to identify the vector data 220 from the image repository that corresponds to the location depicted within the image 210 and load the vector data 220 into memory. In one embodiment, the vector data 220 is previously generated from reference images that have relatively precise geo-location data, such as images captured during a survey of the tree farm where surveyors used equipment that could calculate geo-location data with high precision. The geo-location data may comprise longitude and latitude coordinate information for known geographical boundaries or property lines such as boundaries of orchards within the tree farm, or coordinates of known buildings, and/or other objects.

In one embodiment, the vector data 220 may be generated from a reference image using image segmentation. Image segmentation is a process of partitioning an image into multiple segments i.e. sets or groups of pixels also called super-pixels. A goal of the segmentation process is to simplify and or change the representation of an image into something that is more meaningful and easier to analyze. Image segmentation is typically used to locate objects and boundaries (lines, curves, polygons) in images. The vector data 220 is then generated to represent the objects and/or boundaries found in the image. These are referred to as "known features 225." In one embodiment, the image segmentation includes the process of assigning a label to pixels in an image such that pixels with the same label share certain characteristics.

Thus, the geo-location data has known features because the high precision geo-location data can be used to accurately identify features depicted by the vector data 220, such as shapes, sizes, locations, and/or other features of lines, polygons, or other objects depicted by the vector data 220. In one embodiment, the geo-referencing module 205 identifies the vector data 220 for the location and indexes the vector data 220 using a spatial index function to create indexed vector data. The vector data 220 is indexed to improve subsequent processing that involves information extracted from the vector data. In one embodiment, the indexed vector data corresponds to particular vector layers for an area of interest such as the location depicted within the image 210.

Once the vector data 220 is identified, the geo-referencing module 205 extracts known features 225 of known polygons represented by the vector data 220. The known features 225 can comprise polygon area, a number of points of a polygon, a number of angles of the polygon, boundary data, convex-hull data, minimum bounding rectangle data, and/or other features of the known polygons. A known feature is a feature within the vector data 220, which can be identified using various types of image and feature recognition functionality that can evaluate pixel data (e.g., color, depth information, etc.) to identify lines, shapes, polygons, and/or other features defining the size, shape, and/or location of objects depicted by the vector data 220. For example, image data of a living room may be evaluated to identify lines, shapes, polygons, and/or other features defining the size, shape, and location of a chair, a couch, a television, a lamp, etc. In this way, the features can be used to identify certain objects within the room. These features are referred to as known features because the features have high precision (known) geo-location data, such as high precision longitude and latitude coordinate information for the location depicted by the vector data 220.

Once the known features 225 are extracted, the geo-referencing module 205 extracts polygon features from the input image 210 as extracted features 230 for comparison with the known features 225. The extracted features 230 can comprise polygon area, a number of points of a polygon, a number of angles of the polygon, boundary data, convex-hull data, minimum bounding rectangle data, and/or other features of the polygons depicted within the image 210. The extracted features 230 can correspond to polygons identified from the image 210 using a contour function that is used to identify polygons surrounding an area of interest. An extracted feature is a feature extracted from the image 210 using various types of image and feature recognition functionality that can evaluate pixel data (e.g., color, depth information, etc.) to identify lines, shapes, polygons, and/or other features defining the size, shape, and/or location of objects depicted by the image 210. For example, the image 210 depicting a kitchen may be evaluated to identify lines, shapes, polygons, and/or other features defining the size, shape, and location of a stove, a sink, a refrigerator, etc. In this way, the features can be used to identify certain objects within the room. These features are referred to as extracted features because the features may not have high precision geo-location data and are extracted from the input image 210. In one embodiment, a feature comprises a polygon feature of a polygon represented within the image 210. The polygon comprises pixels that together illustrate an object, such as the stove depicted within the image 210 by pixels of a first polygon, the sink depicted within the image by pixels of a second polygon, etc.

In one embodiment of identifying and extracting the features from the image 210, binary segmentation is performed upon the image 210 for extracting the extracted features 230. In particular, the image 210 is converted into a binary image. Any holes in the binary image are filled with values such as through interpolation or any other technique used to fill missing data with values such as by filling a hole with a value of neighboring pixel. Accordingly, binary segmentation is performed upon the binary image for extracting the extracted features 230. In this way, the known features 225 may correspond to known boundaries of the location and the extracted features 230 may correspond to extracted boundaries of the location.

Because the geo-reference metadata 215 can be inaccurate due to collection errors, the extracted features 230 can be skewed, and thus could exhibit differences in size and shape from the known polygons features 225. Accordingly, the geo-referencing module 205 scales the extracted features 230 so that each extracted polygon's total length is the same, such as lengths of 2. This can be accomplished by dividing lengths of edges of an extracted feature by a total length of the extracted feature. Once the extracted features 230 are scaled, the extracted features 230 can be more accurately compared with the known features 225, such as for identifying similarities between polygons described by the polygon features.

The geo-referencing module 205 determines similarities 235 between the extracted features 230 and the known features 225 from the vector data 220 for the location depicted in the image 210. In one embodiment of determining similarities 235, a turning function algorithm is performed to determine similarities between polygons of the extracted features 230 and polygons of the known features 225. The turning function algorithm determines one or more turning functions for each known feature and each extracted feature. An example of a turning function for shape comparison is included in U.S. Pat. No. 8,031,948 to Lie et al., which is incorporated in its entirety herein by reference.

Because a turning function for a polygon feature will be different depending on the initial starting point along the polygon, a set of turning functions for the polygon feature are calculated. The set of turning functions may comprise a number of turning functions equal to a number of vertices of the polygon feature, and thus each turning function starts at a different point along the polygon feature. In this way, one of the turning functions is selected from the set of turning functions as the turning function for the polygon feature, such as a smallest turning function.

In one embodiment of performing the turning function algorithm for a first known feature and a first extracted feature, a first set of angles are calculated between neighboring edges of the first known feature by the geo-referencing module 205. An angle between two neighboring edges can be calculated as a dot product of two vectors representing the two neighboring edges.

A first turning function is determined for the first known feature by summing values within the first set of angles. Thus, the first turning function is a sum of angles between edges of the first known feature. In this way, the first turning function for the first known feature is determined. As previously described, this process can be performed with different starting points along the first known feature to create a set of turning functions. The first turning function is then selected from the set of turning functions, such as a smallest turning function having the smallest sum of angles between edges.

Once the first turning function for the first known feature is determined, the geo-referencing module 205 calculates a second turning function for the first extracted feature. In particular, the geo-referencing module 205 calculates a second set of angles between neighboring edges of the first extracted feature. A second turning function is determined for the first extracted feature by summing values within the second set of angles. In this way, the second turning function for the first extracted feature is determined. As previously described, this process can be performed with different starting points along the first extracted feature to create a set of turning functions. The second turning function is then selected from the set of turning functions, such as a smallest turning function.

Once the geo-referencing module 205 has determined the first turning function for the first known feature and the second turning function for the first extracted feature, the geo-referencing module 205 compares a distance between the first turning function and the second turning function to determine a similarity between the first known feature and the first extracted feature. If the first known feature and the first extracted feature are similar, then the distance will be small. The distance is a sum of squares of differences between the first turning function and the second turning function.

Other considerations can be taken into account when determining the similarities 235. In one embodiment, the similarity between the first known feature and the first extracted feature can be determined based upon a similarity between a first polygon area of the first extracted feature and a second polygon area of the first known feature. In another embodiment, the similarity between the first known feature and the first extracted feature can be determined based upon a similarity between a first minimum bounding rectangle capable of encompassing the first extracted feature and a second minimum bounding rectangle capable of encompassing the first known feature. In another embodiment, the similarity between the first known feature and the first extracted feature can be determined based upon a similarity between a first convex-hull of the first extracted feature and a second convex-hull of the first known feature. A convex-hull may be a smallest convex polygon that encloses a polygon feature. In this way, the similarities 235 are determined.

Using the similarities 235, the geo-referencing module 205 generates a data structure such as a graph 240 comprising a first set of nodes representing the extracted features 230 and a second set of nodes representing the known features 225. If a similarity between an extracted feature represented by a node in the first set of nodes and a known feature represented by a node in the second set of nodes exceeds a similarity threshold, then an edge is created between the two nodes. Thus, if a known feature and an extracted feature are similar, then nodes representing them will be connected by an edge within the graph 240. In one embodiment, distances between nodes within the graph 240 correspond to the similarities 235 such that a small distance between two nodes indicates a high similarity between two polygon features represented by the two nodes. In one embodiment, nodes within a set of nodes can only be connected to nodes within the other set of nodes.

Once the graph 240 is generated, the graph 240 is solved to match extracted features with the same/similar known features. Similarities between geometries and/or properties of the extracted features and the known features are represented using a matrix of weights. In particular, the geo-referencing module 205 creates a matrix 245 from the graph 240. The matrix 245 comprises rows and columns. The rows are labeled to represent the extracted features 230 (one row per feature) and the columns are labeled to represent the known features 225 (one column per feature) or vice versa. Weight values are populated within the entries of the matrix 245. See also matrix 445 of FIG. 4E for additional descriptions. A weight value for two polygon features (identified by a cell at a row and a column intersection in the matrix 245 or 445) corresponds to a distance between nodes representing the two polygon features within the graph 240. The smaller the weight value, the more similar the two polygon features. In one embodiment, if there is no edge connecting two nodes, then a virtual edge with a weight value of infinity or some other high weight value is created and added as an entry into the matrix 245 to represent high dissimilarity between the two polygon features.

Because the number of extracted features and known features may be different, extra rows or columns can be added to the matrix 245 so that that the matrix 245 is a square having the same number of rows and columns. For example, if an extracted polygon feature occurs within the image 210 but not the vector data 220 (e.g., a newly planted tree that was planted after the vector data 220 was created), then a row is added for the extracted polygon feature. Cells of the row are assigned a maximum weight value indicating a lack of similarity between the extracted polygon feature and known features 225 within the vector data 220. Similarly, if a known polygon feature occurs within the vector data 220 but not the image 210 (e.g., a tree that was removed after the vector data was created but before the image was captured), then a column is added for the known polygon feature. Cells of the column are assigned a maximum weight value indicating a lack of similarity between the known polygon feature and extracted features 230 from the image 210.

The geo-referencing module 205 is configured to process the weight values within the matrix 245 to identify matches between known features and extracted features. In one embodiment, a match between a known feature and an extracted feature can be determined based upon an entry within the matrix 245 between the known feature and the extracted feature having a weight value below a weight threshold, such as a smallest weight value indicative of high similarity. In one embodiment of processing the weight values of the matrix 245, the geo-referencing module 205 executes a spatial algorithm upon the matrix 245 to perform minimum cost matching between extracted features and known features. Minimum cost matching identifies entries within the matrix having minimum weight values, thus indicative of high similarity between corresponding polygon features.

In one embodiment of processing the weight values of the matrix 245, the geo-referencing module 205 evaluates rows within the matrix 245. For each row, a smallest weight value of a row is identified. The smallest weight value is subtracted from each weight value in the row. Alternatively or additionally, the geo-referencing module 205 can process the columns within the matrix 245 by identifying a smallest weight value for each column and subtracting the smallest weight value from each weight value within the corresponding column.

Once the smallest weights are subtracted from the rows and/or columns, the geo-referencing module 205 crosses out a minimum number of lines in either a vertical or horizontal direction within the matrix 245 to remove (cross out) all zero weight values in the matrix 245. If the number of crossed out lines is equal to the number of rows or columns, then a solution of matches between known features and extracted features has been identified based upon a current state of the matrix 245. Entries within the matrix 245 between known features and extracted features having the lowest weight value such as zero are indicative of a match. For example, an entry between a second known feature represented by row 3 of the matrix 245 and a third extracted feature represented by column 4 of the matrix 245 may have a zero weight value, thus indicative of the second known feature and the third extracted feature representing the same polygon, such as the same real-world tree in the tree farm.

If the number of crossed out lines is not equal to the number of rows or columns, then the geo-referencing module 205 continues to process the matrix 245. The geo-referencing module 205 determines a current smallest weight value from all uncrossed weight values in the matrix 245. The geo-referencing module 205 subtracts the current smallest weight value from all uncrossed weight values. The geo-referencing module 205 adds the current smallest weight value to weight values crossed by two lines. In this way, the geo-referencing module 205 evaluates a current state of the matrix 245 to determine whether a number of crossed out lines is equal to the number of rows or column, and thus a solution has been identified.

Once the geo-referencing module 205 has identified the solution, the geo-referencing module 205 can assign geo-location data of known features, such as longitude and latitude information of known polygons represented by the known features, to polygons of matched extracted features within the image 210 to create a modified image 250 with more precise geo-location data. Thus, the modified image 250 can be used to more accurately located objects in the real-world that correspond to the polygons, such as a particular tree in the tree farm. If the image 210 comprises geo-reference metadata 215, then the geo-reference metadata 215 is modified with the geo-location data of the known features to create modified geo-reference metadata 255 for inclusion within the modified image 250. If the image 210 does not comprise geo-reference metadata, then the geo-location data can be assigned to the image 210 as new geo-reference metadata.

Figure 3:
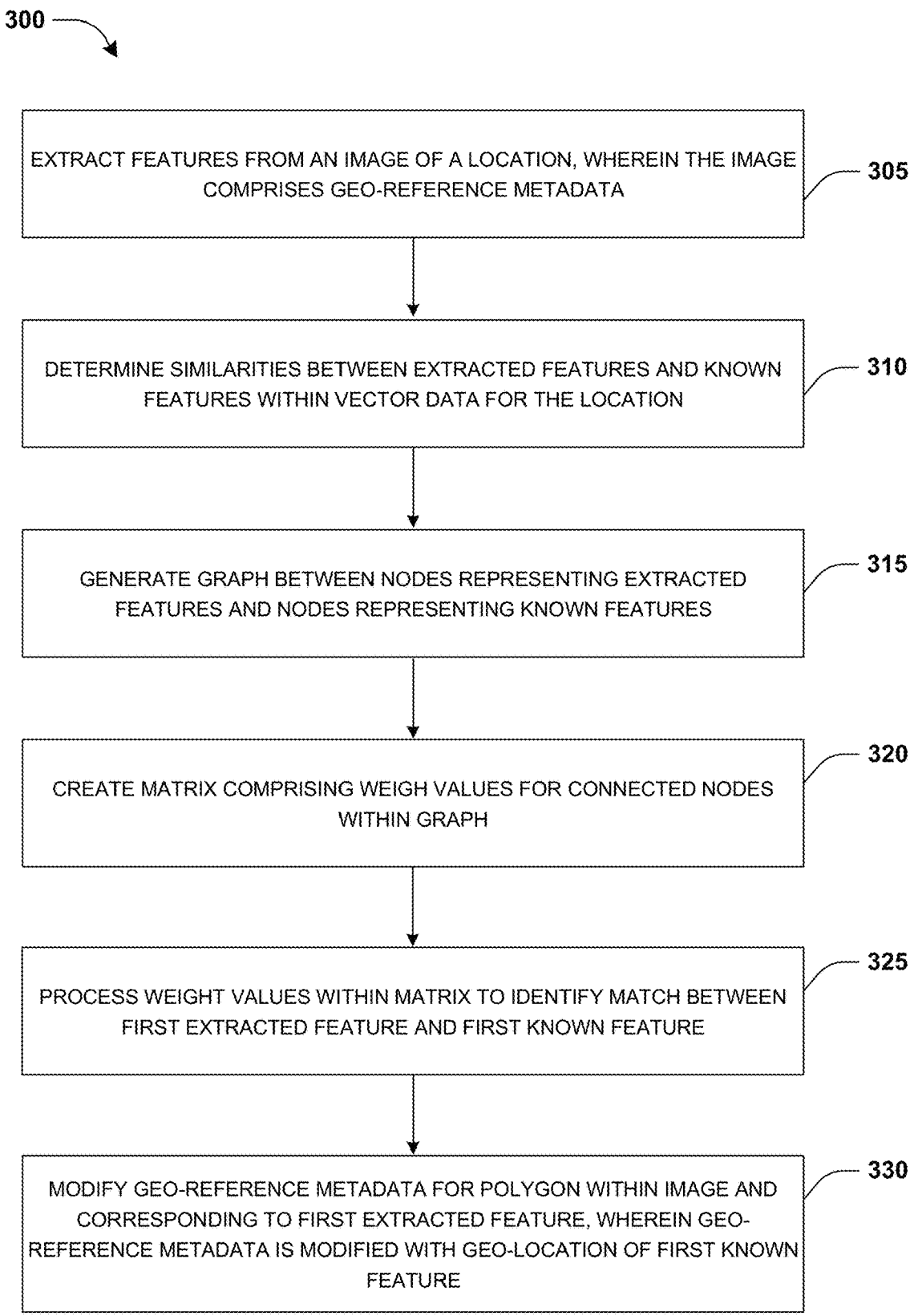
FIG. 3 illustrates an embodiment of a method associated with computerized geo-referencing for images.

With reference to FIG. 3, one embodiment of a computer implemented method 300 associated with computerized geo-referencing for images is illustrated. Method 300 will be described with additional reference to FIGS. 4A-4G. In one embodiment, the method 300 is performed by the geo-referencing module 205 utilizing various computing resources of the computer 615, such as the processor 620 (see FIG. 6) for executing instructions associated with extracting polygon features, determining similarities, generating graphs, creating matrixes, and/or processing weight values. Memory 635 and/or disks 655 are used for storing polygon features, similarities, graphs, matrixes, weight values, and/or other data. Network hardware is used for communicating data structures and/or other data between the computer 615 and remote computers over a network.

The method 300 is triggered upon a determining that an image 420 (see FIG. 4B) is to be geo-referenced to obtain relatively more precise and/or accurate geo-location data, such as longitude and latitude of objects represented by polygons within the image 420. After completion of the present geo-referencing process, the objects in the image may be located within a real-world location with improved precision. In one embodiment, as one example of a practical application, the computer 615 can use such geo-location data to automatically identify a location of an object such as faulty utility equipment. For example, image and/or feature recognition functionality may be capable of identifying features within an image that define the size, shape, and location of objects depicted within the image, such as a transformer. The computer 615 can transmit a dispatch command over a network to a computing device of a utility worker to direct the utility worker to the location of the faulty utility equipment for servicing.

In one embodiment of computerized geo-referencing, the geo-referencing module 205 may utilize vector data 405 for geo-referencing the image 420. As previously described, the location of the input image (image 420) is determined from the image or identify by a user so that relevant reference images and vector data is loaded that corresponds to the same location. In particular, coordinates of the image 420 are used to select the vector data 405 (e.g., from available vector data) having similar coordinates or coordinates encompassing the coordinates of the image 420. In this way, the vector data 405 comprises image data for a location depicted by the image 420, and thus can be used for geo-referencing the image 420.

Figure 4A:
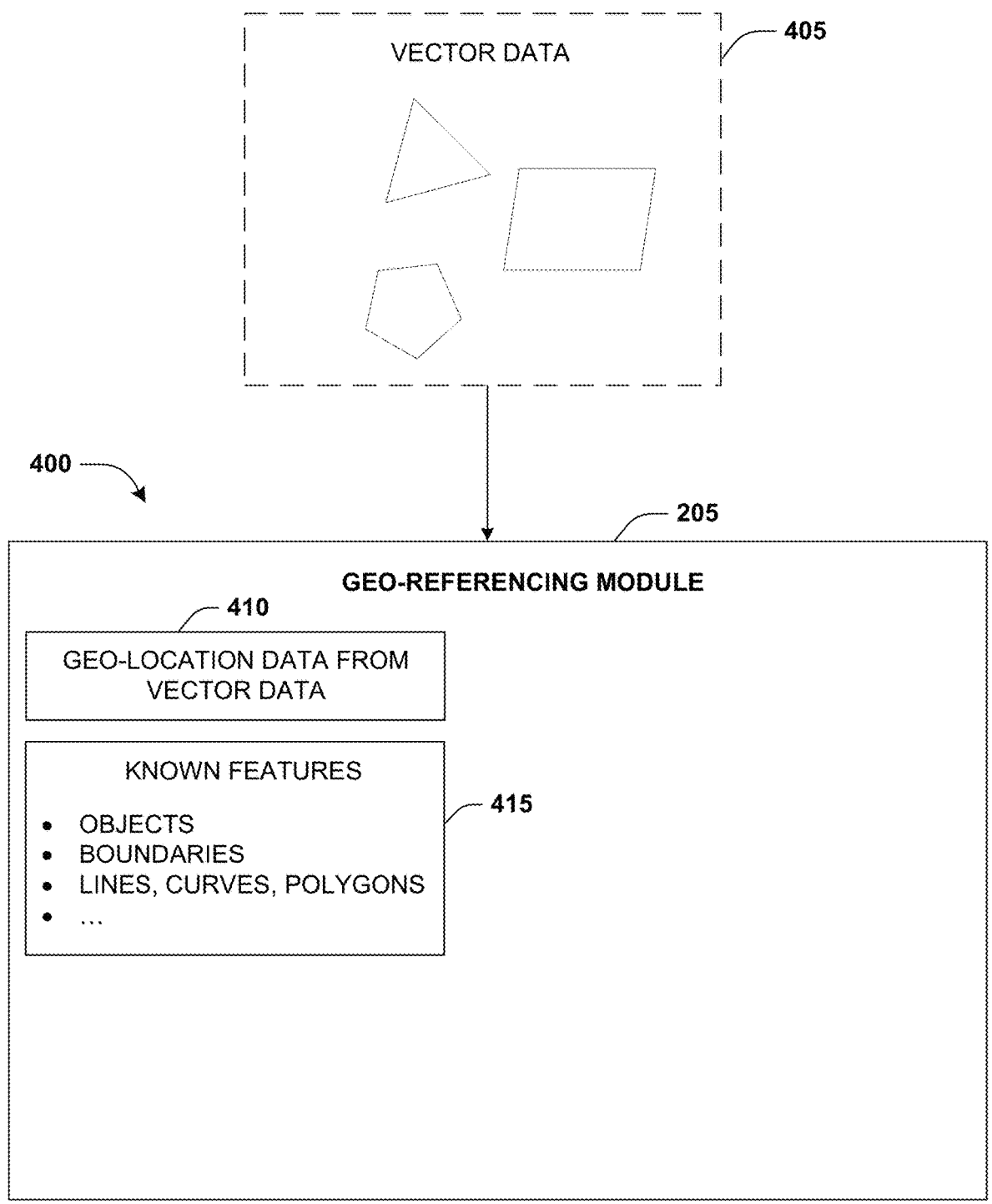
FIG. 4A illustrates an embodiment of a system associated with computerized geo-referencing for images, where known features are identified from vector data.

The geo-referencing module 205 extracts known features 415 from the vector data 405, as illustrated by the example system 400 of FIG. 4A. The known features 415 may comprise information related to boundaries, lines, curves, angles, polygons, and/or other features corresponding to size, the shape, and/or locations of objects depicted within the vector data 405. In one embodiment, the known features may comprise a polygon area (e.g., an area of a polygon illustrating/representing a blueberry bush within the vector data 405), a number of points of a polygon, a number of angles of the polygon, boundary data of the polygon, convex-hull data, minimum bounding rectangle data, and/or other features of the known polygons depicted within the vector data 405. Thus, a set of known features 415 are loaded for comparison to the features of the input image.

In one embodiment, the known features 415 may comprise data relating to vertices and edges of a known triangle, a known parallelogram, and a known pentagon represented within the vector data 405. That is, a known shape is the vertices and edges of an object depicted within the vector data 405, such as vertices and edges of a tractor. The vector data 405 may be associated with geo-location data 410, such as high precision survey results of a location represented by the vector data 405. Thus, the geo-location data 410 may comprise relatively accurate geo-locations such as longitude and latitude values of the known triangle, the known parallelogram, and the known pentagon within the location.

Figure 4B:
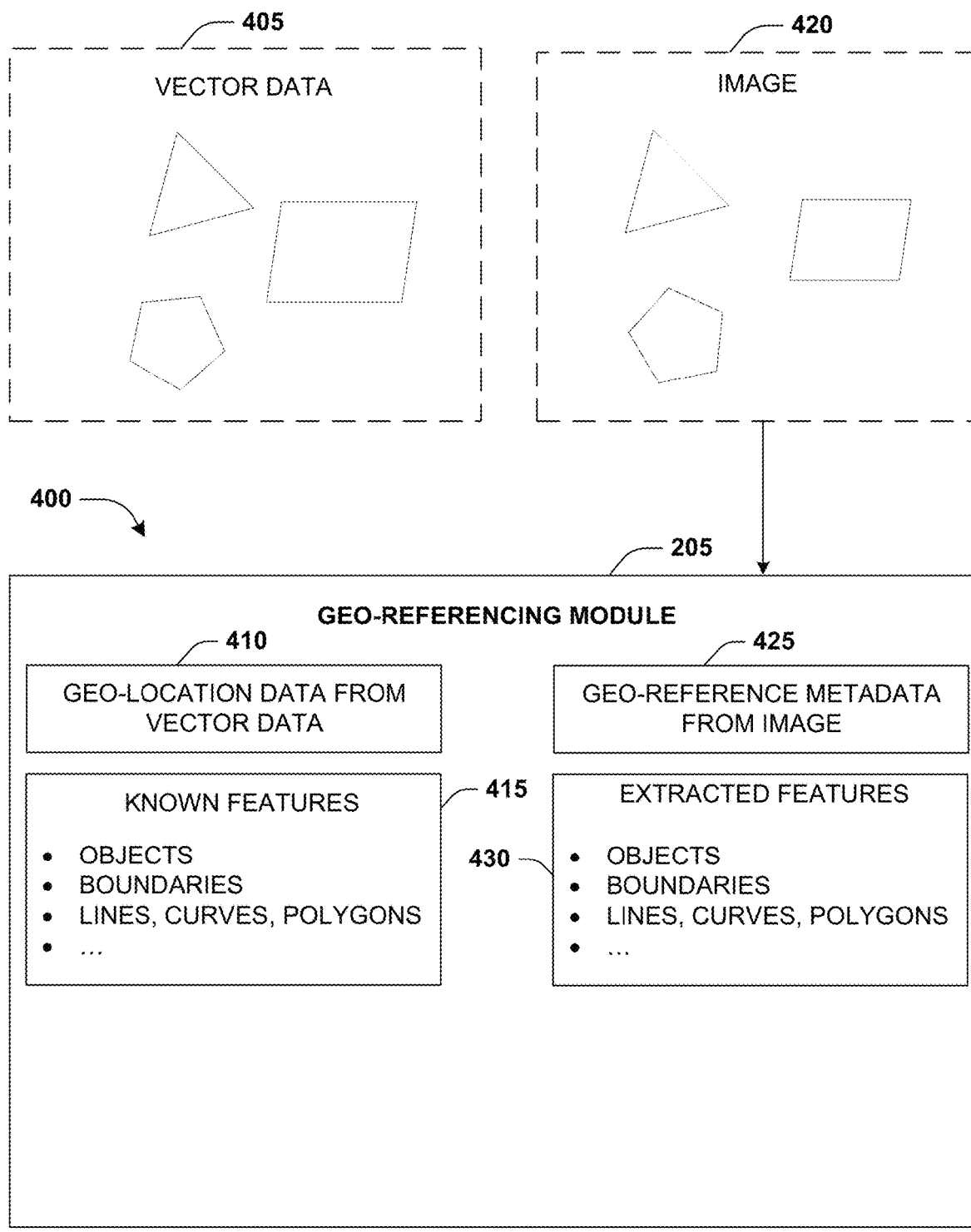
FIG. 4B illustrates an embodiment of a system associated with computerized geo-referencing for images, where extracted features are extracted from an image.

At 305, the geo-referencing module 205 extracts polygon features from the image 420 as extracted features 430, as illustrated by the example system 400 of FIG. 4B. Image and/or feature recognition is performed upon the image 420, such as to evaluate pixel data of color, depth, and/or other data to identify size, shape, and/or locations of lines, angles, boundaries, points, vertices, edges, and/or other features of polygons representing real-world objects depicted within the image 420. That is, the extracted features 430 may comprise information related to objects, boundaries, lines, curves, and polygons, such as polygon area, a number of points of a polygon, a number of angles of the polygon, boundary data, convex-hull data, minimum bounding rectangle data, and/or other features of the known polygons within the image 420 representing real-world objects depicted by the image 420.

In one embodiment, the extracted features 430 may comprise data relating to vertices and edges of an extracted triangle, an extracted parallelogram, and an extracted pentagon of the image 420. In one embodiment, the image 420 comprises geo-reference metadata 425 of geo-locations such as longitude and latitude values of the extracted triangle, the extracted parallelogram, and the extracted pentagon of the image 420. For example, the extracted triangle may correspond to a piece of farm equipment depicted within the image 420, and thus a geo-location for the extracted triangle corresponds to coordinate data of the farm equipment within the real-world.

Because the geo-locations can be inaccurate due to equipment imprecision, errors, and incorrect calibration, the geo-referencing module 205 can determine similarities between the known features 415 and the extracted features 430 in order to use the more precise geo-location data 410 from the vector data 405 for updating the less precise geo-reference metadata 425. In another embodiment, the image 420 may lack geo-reference metadata, and thus the geo-referencing module 205 can use the similarities to generate, assign, and add new geo-reference metadata to the image 420.

Figure 4C:
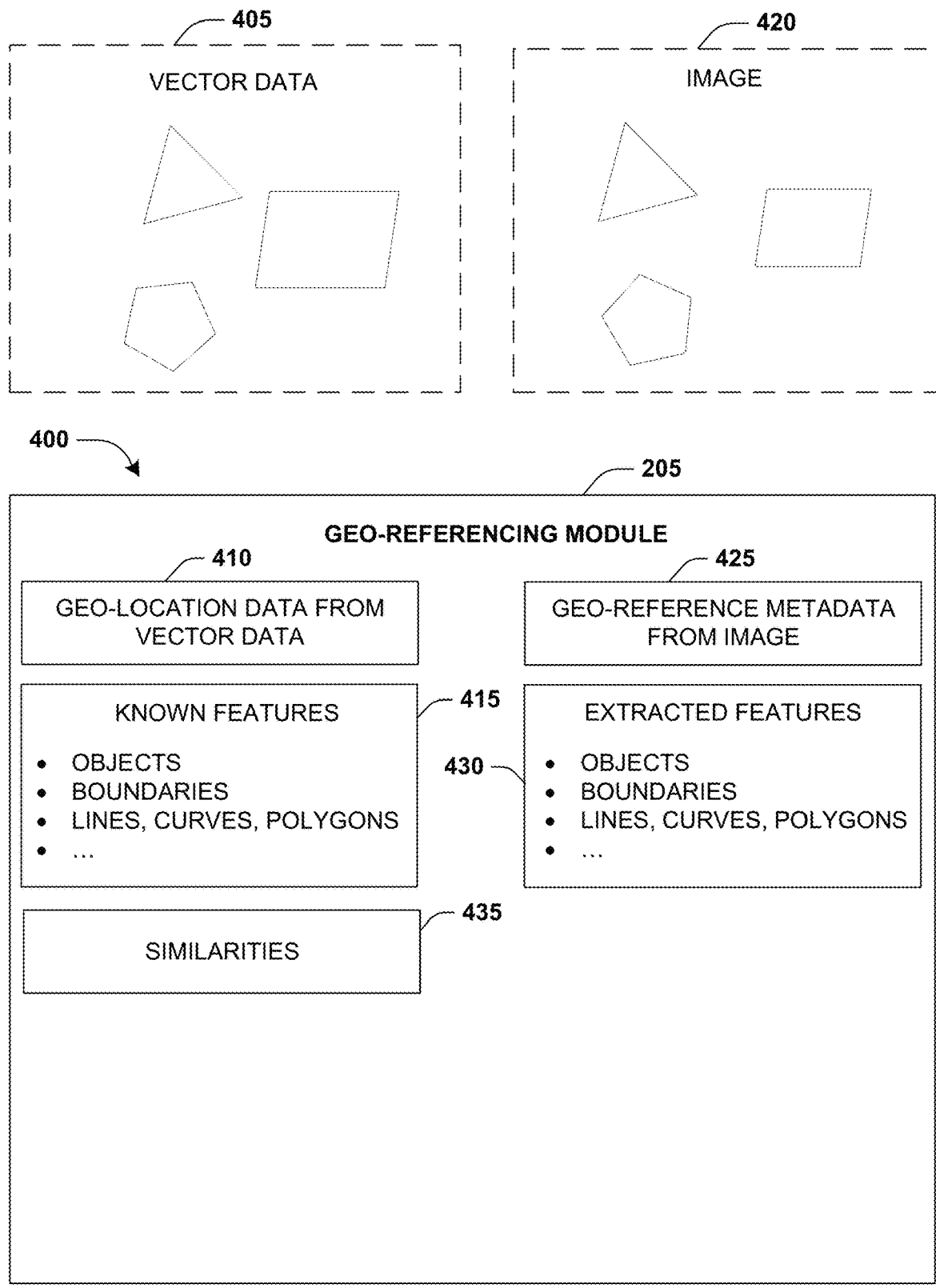
FIG. 4C illustrates an embodiment of a system associated with computerized geo-referencing for images, where similarities are determined.

At 310, the geo-referencing module 205 compares and determines similarities 435 between the known features 415 of polygons within the vector data 405 and the extracted features 430 of polygons within the image 420, as illustrated in the example system 400 of FIG. 4C. The geo-referencing module 205 may determine the similarities 435 based upon similarities between polygon area, minimum bounding rectangles, convex-hulls, turning functions and/or other properties of the known triangle, the known parallelogram, and the known pentagon and the extracted triangle, the extracted parallelogram, and the extracted pentagon. For example, the extracted triangle and the known triangle may have similar turning functions, areas, minimum bounding rectangles, etc. In contrast, the extracted triangle and the known parallelogram may have dissimilar turning functions, areas, minimum bounding rectangles, etc. In this way, the geo-referencing module 205 determines the similarities 435 that can be used for generating a graph for further analysis.

Figure 4D:
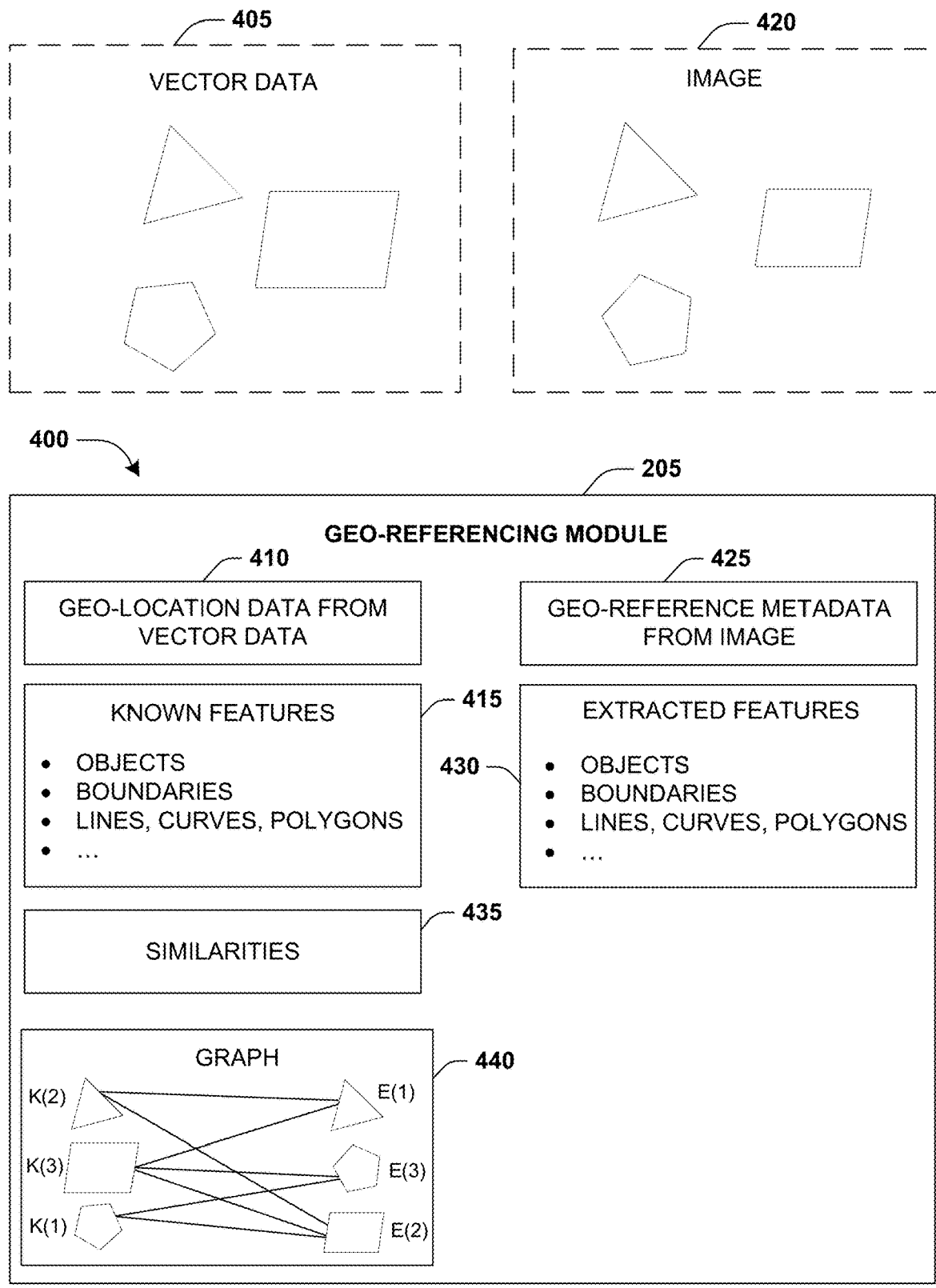
FIG. 4D illustrates an embodiment of a system associated with computerized geo-referencing for images, where a graph is generated.
Figure 4E:
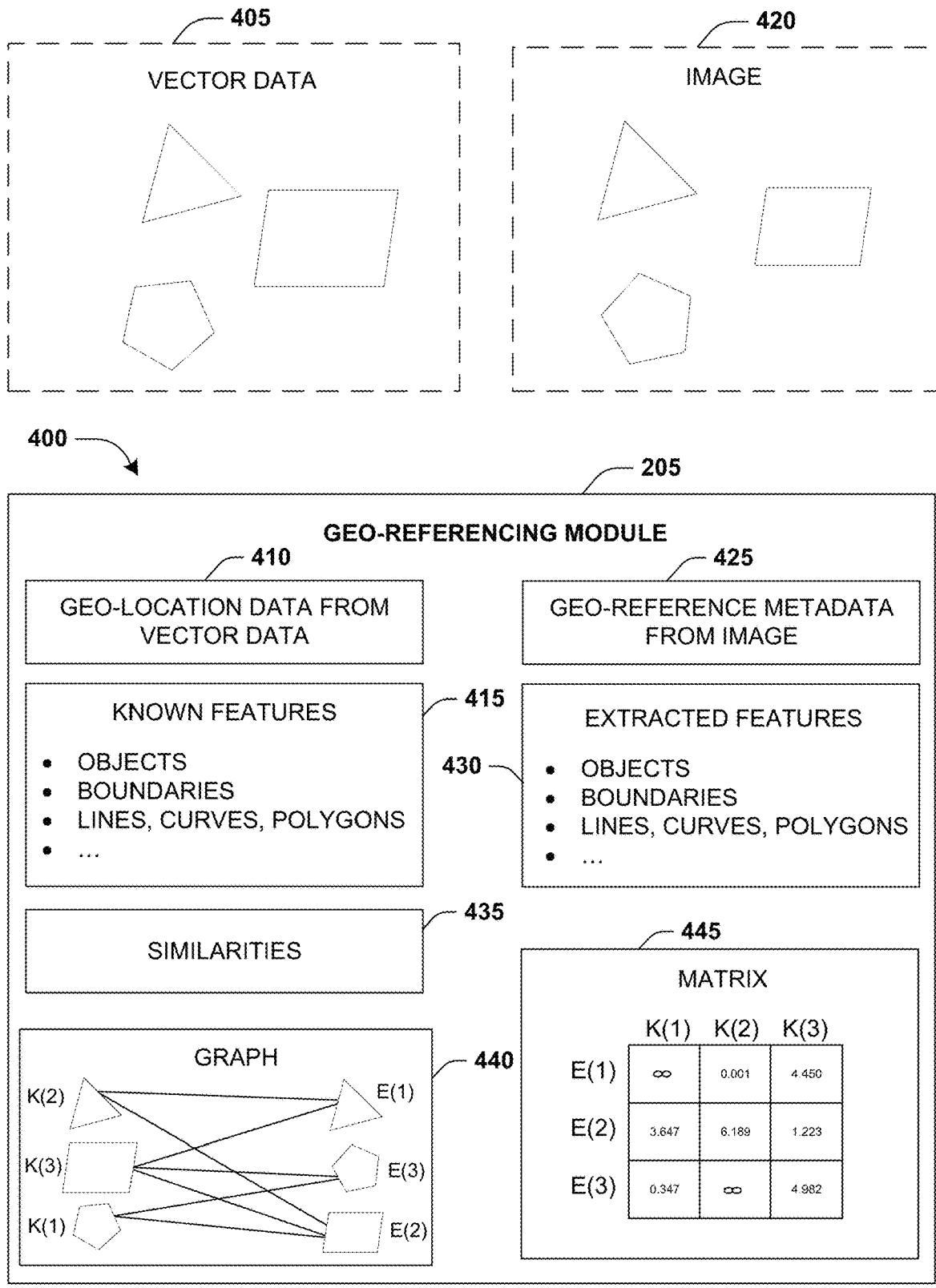
FIG. 4E illustrates an embodiment of a system associated with computerized geo-referencing for images, where a matrix is created.

At 315, the geo-referencing module 205 generates a graph 440 based upon the similarities 435, as illustrated in the example system 400 of FIG. 4D. The graph 440 comprises a first set of nodes representing the known features 415 such as the known triangle, the known parallelogram, and the known pentagon. That is, a node represents a polygon within the graph 440, and corresponding polygons are depicted as the nodes within graph 440 for illustrative purposes. The graph 440 comprises a second set of nodes representing the extracted features 430 such as the extracted triangle, the extracted parallelogram, and the extracted pentagon. If a similarity between a known feature and an extracted feature exceeds a similarity threshold, then an edge is created between nodes representing the known feature and the extracted feature within the graph 440. A distance of the edge between the two nodes may represent a weight value, and thus weight values may be assigned to edges. The smaller the distance and weight value, the more similar the known feature and the extracted feature. The distance and/or the weight value may be a function of or derived from the similarity.

In one embodiment, the known triangle is connected by edges to the extracted triangle and the extracted parallelogram. The known parallelogram is connected by edges to the extracted triangle, the extracted pentagon, and the extracted parallelogram. The known pentagon is connected by edges to the extracted pentagon and the extracted parallelogram. In this way, the graph 440 is created for further analysis for matching polygon features using a matrix (e.g., for identifying matching polygons within the vector data 405 and the image 420). Similarities between geometries and/or properties of the extracted features and the known features are represented using a matrix of weights. At 320, the geo-referencing module 205 creates a matrix 445 based upon the graph 440, as illustrated by the example system 400 of FIG. 4E. In one embodiment, rows of the matrix 445 are labeled to represent the extracted features 430 (one row per feature), such as E(1) representing the extracted triangle, E(2) representing the extracted parallelogram, and E(3) representing the extracted pentagon. The columns of the matrix 445 are labeled to represent the known features 415 (one column per feature), such as K(1) representing the known pentagon, K(2) representing the known triangle, and K(3) representing the known parallelogram.

The geo-referencing module 205 assigns weight values to entries within the matrix 445 based upon the weight values of edges within the graph 440. A weight value for two polygon features (identified by a cell at a row and a column intersection in the matrix 445) represents a similarity weight/score for the two features. For example, assume that a weight value of 0.001 has been determines and is assigned to an entry for E(1) and K(2), which represents a high similarity between the extracted triangle represented by E(1) and the known triangle represented by K(2). A weight value of 5.450 is assigned to an entry for E(1) and K(3), which represents a low similarity between the extracted triangle represented by E(1) and the known parallelogram represented by K(3). A virtual edge with a weight value of infinity or some other high weight value is assigned to an entry for E(1) and K(1) because no edge exists between a node for the extracted triangle represented by E(1) and a node for the known pentagon represented by K(1). In this way, entries are populated within the matrix 445 based upon weight values of edges between nodes within the graph 440 and/or virtual edges.

Figure 4F:
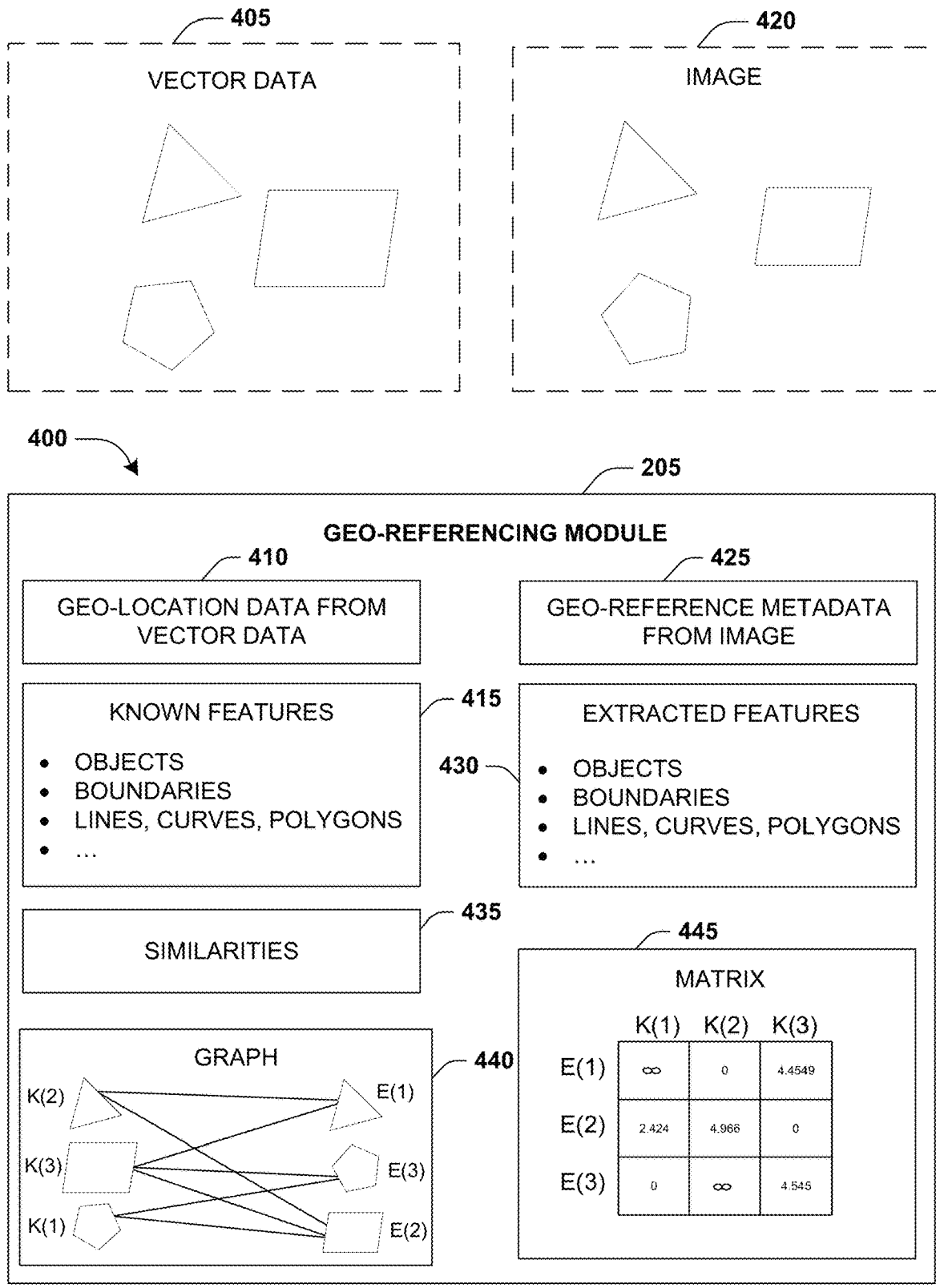
FIG. 4F illustrates an embodiment of a system associated with computerized geo-referencing for images, where a matrix is processed.
Figure 4G:
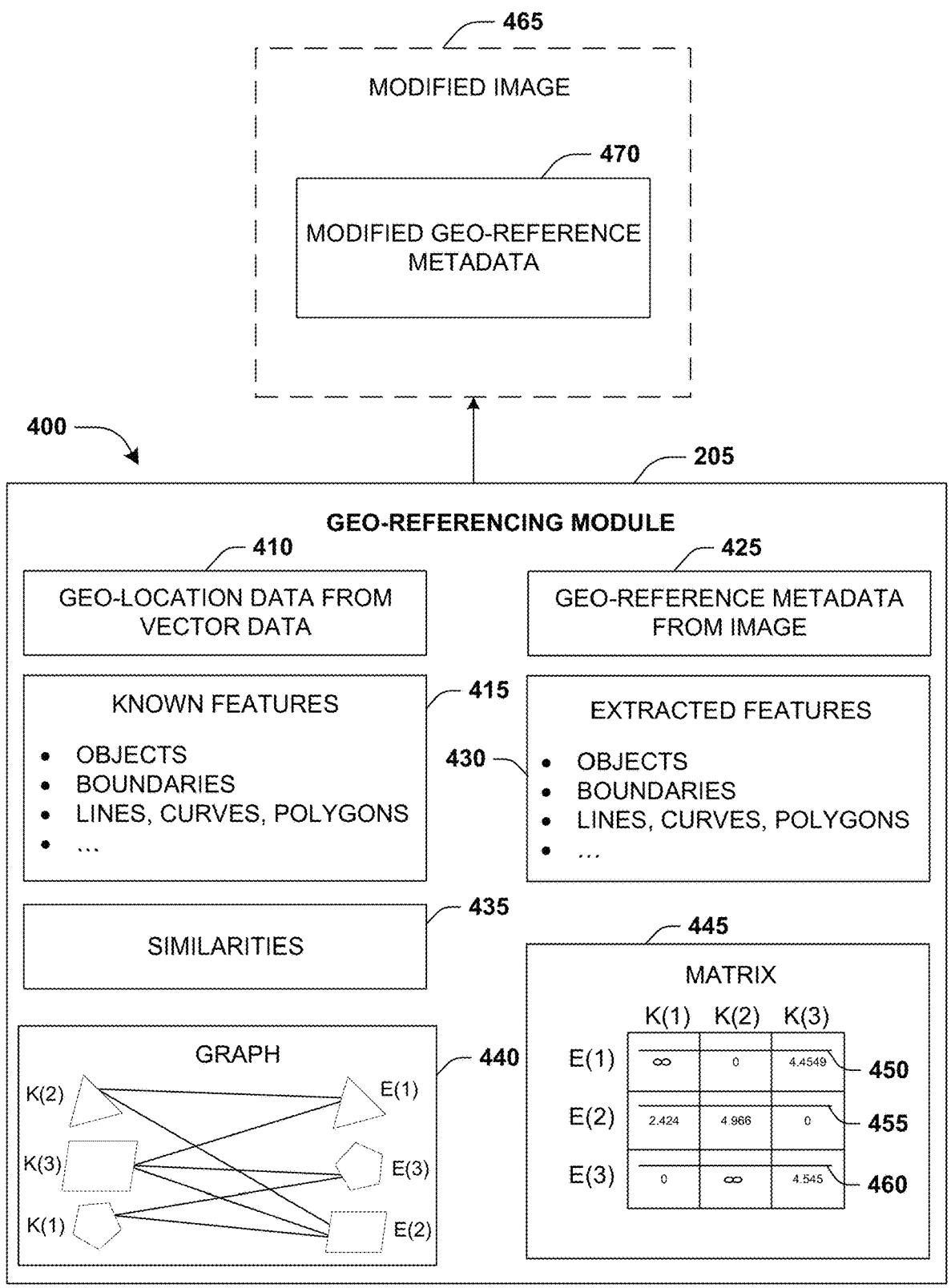
FIG. 4G illustrates an embodiment of a system associated with computerized geo-referencing for images, where matches are identified between known features and extracted features.

At 325, the geo-referencing module 205 processes the weight values within the matrix 445 to identify matches between known features and extracted features, as illustrated by the example system 400 in FIGS. 4F and 4G. In particular, for each row (or column) within the matrix 445, the geo-referencing module 205 identifies a smallest weight value such as 0.001 of row 2, 2.223 of row 3, and 0.347 of row 4. The geo-referencing module 205 subtracts the smallest weight value from all of the weight values in the corresponding row (or column), as illustrated by a current state of the matrix 445 in FIG. 4F. In one embodiment, entries between E(1) and K(2), E(2) and K(3), and E(3) and K(1) have zero weight values, and thus are indicative of corresponding polygon features having high similarity.

Once the smallest weight values have been subtracted from weight values in the same rows (or columns), the geo-referencing module 205 crosses out a minimum number of lines in either a vertical or horizontal direction of the matrix 445 to remove (cross out) all zero weight values in the matrix 445, as illustrated by a current state of the matrix 445 in FIG. 4G. In one embodiment, the geo-referencing module 205 crosses out row 2 with a first line 450 to cross out a zero weight value in row 2 for an entry between E(1)

and K(2). The geo-referencing module 205 crosses out row 3 with a second line 455 to cross out a zero weight value in row 3 for an entry between E(2) and K(3). The geo-referencing module 205 crosses out row 4 with a third line 460 to cross out a zero weight value in row 4 for an entry between E(3) and K(1).

The geo-referencing module 205 determines that the number of crossed out lines is equal to the number of rows, and thus a solution can be identified from the current state of the matrix 445. In particular, entries with zero weight values are indicative of matches between known features and extracted features. A match is found between the extracted triangle represented by E(1) and the known triangle represented by K(2) based upon the zero weigh value for the entry between E(1) and K(2). Another match is found between the extracted parallelogram represented by E(2) and the known parallelogram represented by K(3) based upon the zero weigh value for the entry between E(2) and K(3). Another match is found between the extracted pentagon represented by E(3) and the known pentagon represented by K(1) based upon the zero weigh value for the entry between E(3) and K(1). In this way, geo-location data 410 of the known features 415 can be assigned to matching extracted features because the geo-location data 410 is more accurate and precise than geo-location data within the geo-reference metadata 425 for the image 420.

At 330, the geo-referencing module 205 modifies the geo-reference metadata 425 for the image 420 using the geo-location data 410 of the known features 415 to create modified geo-reference metadata 470. The modified geo-reference metadata 470 is assigned to the image 420 (based on matching features) to create a modified image 465 comprising the modified geo-reference metadata 470. In this way, polygons within the modified image 465 are now associated with more precise and accurate geo-location data such as longitude and latitude values for trees within the tree farm. In this way, objects represented by the polygons, such as trees, can be more accurately identified in the real-world.

Figure 5:
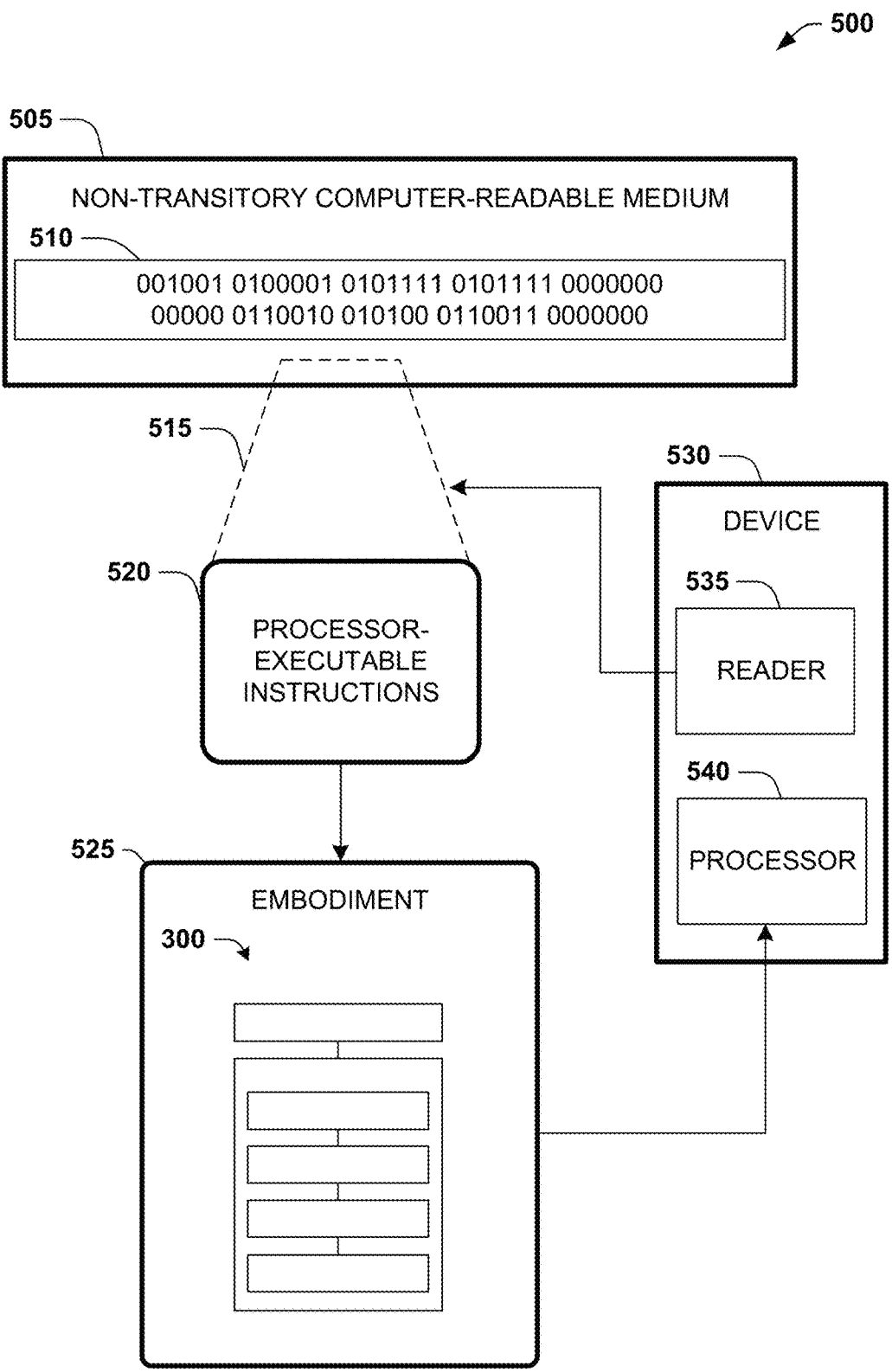
FIG. 5 illustrates an embodiment of a non-transitory computer-readable medium.

FIG. 5 is an illustration of a scenario 500 involving an example non-transitory computer-readable medium 505. In one embodiment, one or more of the components described herein are configured as program modules, such as the geo-referencing module 205, stored in the non-transitory computer-readable medium 505. The program modules are configured with stored instructions, such as processor-executable instructions 520, that when executed by at least a processor, such as processor 540, cause the computing device to perform the corresponding function(s) as described herein. In one embodiment, the, functionality of the geo-referencing module 205, stored in the non-transitory computer-readable medium 505, may be executed by the processor 540 as the processor-executable instructions 520 to perform an embodiment 525 of the method 300 of FIG. 3.

The non-transitory computer-readable medium 505 includes the processor-executable instructions 520 that when executed by a processor 540 cause performance of at least some of the provisions herein. The non-transitory computer-readable medium 505 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 505 stores computer-readable data 510 that, when subjected to reading 515 by a reader 535 of a device 530 (e.g., a read head of a hard disk drive, or a read operation invoked on a solid-state storage device), express the processor-executable instructions 520.

In some embodiments, the processor-executable instructions 520, when executed cause performance of operations, such as at least some of the example method 300 of FIG. 3, for example. In some embodiments, the processor-executable instructions 520 are configured to cause implementation of a system, such as at least some of the example system 200 of FIG. 2, for example.

Figure 6:
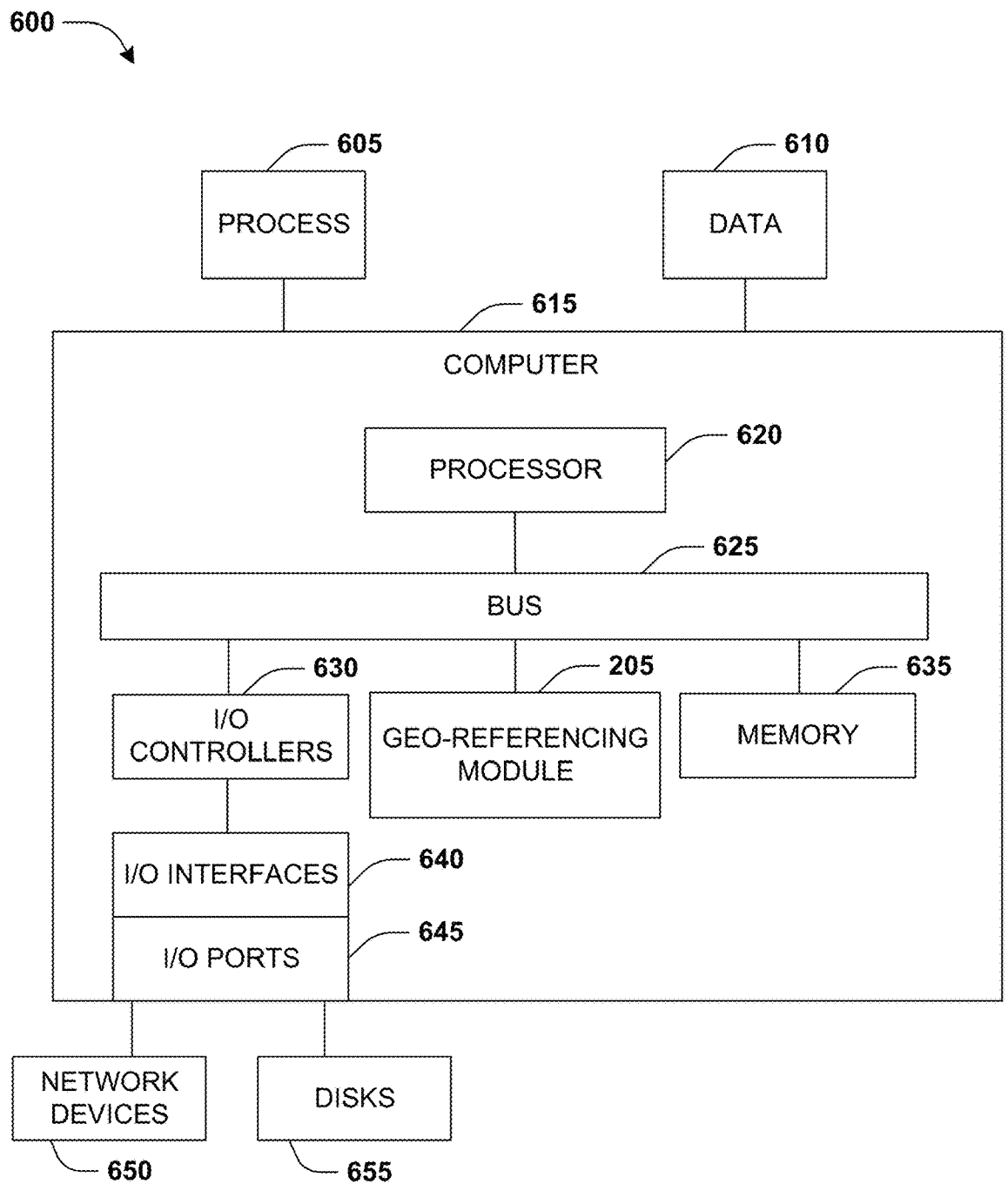
FIG. 6 illustrates an embodiment of a computing system configured with the example systems and/or methods disclosed.

FIG. 6 illustrates an example computing device 600 that is configured and/or programmed with one or more of the example systems and methods described herein, and/or equivalents. The example computing device 600 may be the computer 615 that includes a processor 620, a memory 635, and I/O ports 645 operably connected by a bus 625. In one embodiment, the, the computer 615 may include logic of the geo-referencing module 205 configured to facilitate the system 200 and/or the methods 100 and 300 shown in FIGS. 1-3. In different embodiments, the logic of the geo-referencing module 205 may be implemented in hardware, a non-transitory computer-readable medium 605 with stored instructions, firmware, and/or combinations thereof. While the logic of the geo-referencing module 205 is illustrated as a hardware component attached to the bus 625, it is to be appreciated that in other embodiments, the logic of the geo-referencing module 205 could be implemented in the processor 620, stored in memory 635, or stored in disk 655.

In one embodiment, logic of the geo-referencing module 205 or the computer 615 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 615 as data 610 that are temporarily stored in memory 635 and then executed by processor 620.

The logic of the geo-referencing module 205 may also provide means (e.g., hardware, non-transitory computer-readable medium 605 that stores executable instructions, firmware) for performing rule based source sequencing for allocation.

Generally describing an example configuration of the computer 615, the processor 620 may be a variety of various processors including dual microprocessor and other multi-processor architectures. The memory 635 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 655 may be operably connected to the computer 615 via, for example, the I/O interface 640 (e.g., card, device) and the I/O ports 645. The disks 655 may be, for example, a magnetic disk drive, a solid state disk drive, a floppy disk drive, a tape drive, a Zip drive, a flash memory card, a memory stick, and so on. Furthermore, the disks 655 may be a CD-ROM drive, a CD-R drive, a CD-RW drive, a DVD ROM, and so on. The memory 635 can store a process, such as within the non-transitory computer-readable medium 605, and/or data 610, for example. The disk 655 and/or the memory 635 can store an operating system that controls and allocates resources of the computer 615.

The computer 615 may interact with input/output (I/O) devices via the I/O interfaces 640 and the I/O ports 645. The I/O devices may be, for example, a keyboard, a microphone, a pointing and selection device, cameras, video cards, displays, the disks 655, the network devices 650, and so on. The I/O ports 645 may include, for example, serial ports, parallel ports, and USB ports. I/O controllers 630 may connect the I/O interfaces 640 to the bus 625.

The computer 615 can operate in a network environment and thus may be connected to the network devices 650 via the I/O interfaces 640, and/or the I/O ports 645. Through the network devices 650, the computer 615 may interact with a network. Through the network, the computer 615 may be logically connected to remote computers (e.g., the computer 615 may reside within a distributed computing environment to which clients may connect). Networks with which the computer 615 may interact include, but are not limited to, a local area network (LAN), a new area network (WAN), and other networks.

Figure 7:
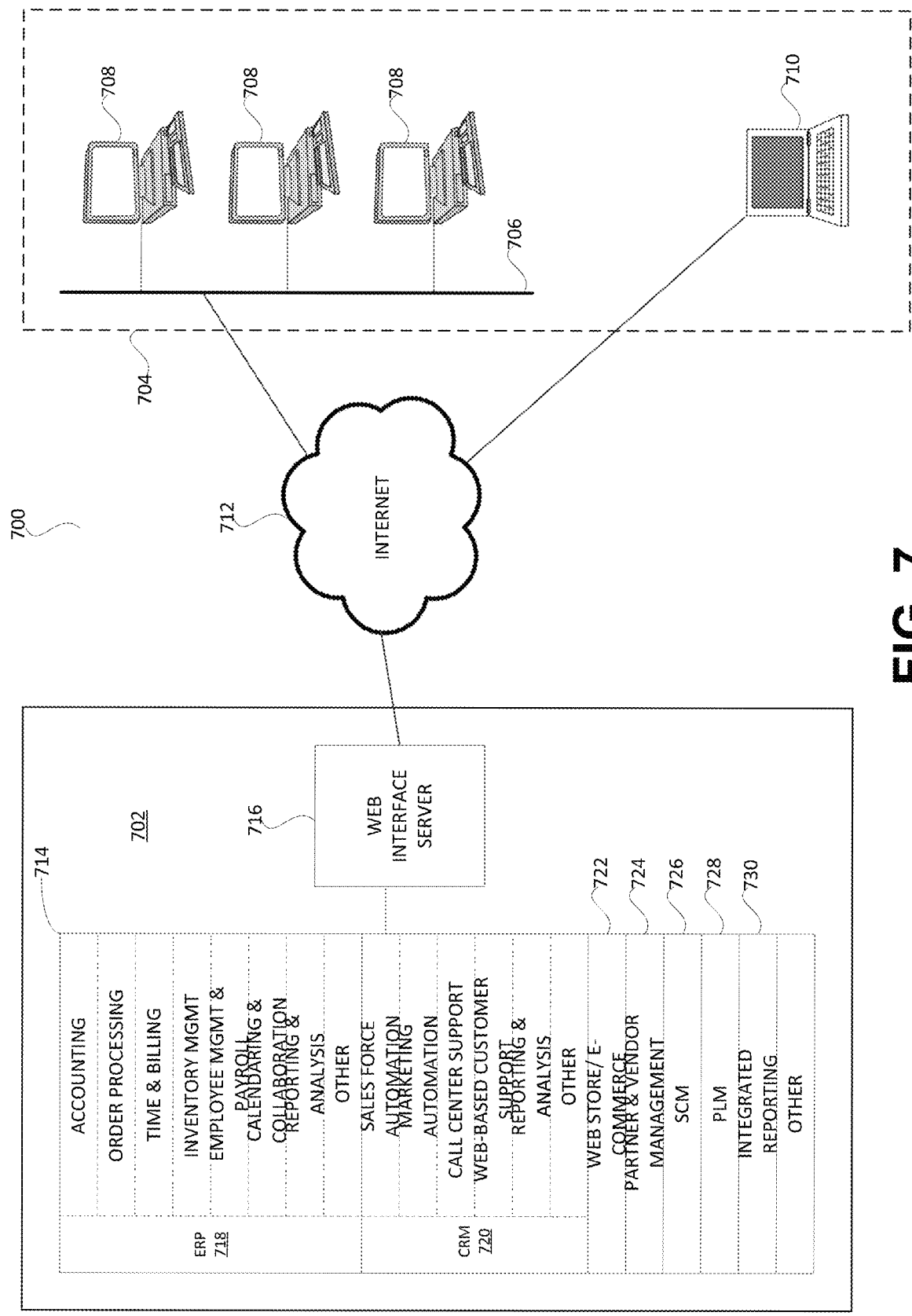
FIG. 7 illustrates an embodiment of an integrated business system and an enterprise network in which an embodiment of the invention may be implemented.

FIG. 7 is a diagram illustrating a system 700 in which an embodiment of the invention may be implemented. Enterprise network 704 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 704 is represented by an on-site local area network 706 to which a plurality of personal computers 708 are connected, each generally dedicated to a particular end user, such as a service agent or other employee (although such dedication is not required), along with an exemplary remote user computer 710 that can be, for example, a laptop computer or tablet computer of a traveling employee having internet access through a public Wi-Fi access point, or other internet access method. The end users (consumers) associated with computers 708 and 710 may possess an internet-enabled smartphone or other electronic device (such as a PDA, tablet, laptop computer) having wireless internet access or other synchronization capabilities. Users of the enterprise network 704 interface with the integrated business system 702 across the Internet 712 or another suitable communications network or combination of networks.

Integrated business system 702, which may be hosted by a dedicated third party, may include an integrated business server 714 and a web interface server 716, coupled as shown in FIG. 7. It is to be appreciated that either or both of the integrated business server 714 and the web interface server 716 may be implemented on one or more different hardware systems and components, even though represented as singular units in FIG. 7.

In a typical example in which system 702 is operated by a third party for the benefit of multiple account owners/tenants, each of whom is operating a business, integrated business server 714 comprises an ERP module 718 and further comprises a CRM module 720. In many cases, it will be desirable for the ERP module 718 to share methods, libraries, databases, subroutines, variables, etc., with CRM module 720, and indeed ERP module 718 may be intertwined with CRM module 720 into an integrated Business Data Processing Platform (which may be single tenant, but is typically multi-tenant).

The ERP module 718 may include, but is not limited to, a finance and accounting module, an order processing module, a time and billing module, an inventory management and distribution module, an employee management and payroll module, a calendaring and collaboration module, a reporting and security module, and other ERP-related modules. The CRM module 720 may include, but is not limited to, a sales force automation (SFA) module, a marketing automation module, a contact list module (not shown), a call center support module, a web-based customer support module, a reporting and security module, and other CRM-related modules. The integrated business server 714 (or multi-tenant data processing platform) further may provide other business functionalities including a web store/eCommerce module 722, a partner and vendor management module 724, and an integrated reporting module 730. An SCM (supply chain management) module 726 and PLM (product lifecycle management) module 728 may also be provided. Web interface server 716 is configured and adapted to interface with the integrated business server 714 to provide one or more web-based user interfaces to end users of the enterprise network 704.

The integrated business system shown in FIG. 7 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 8:
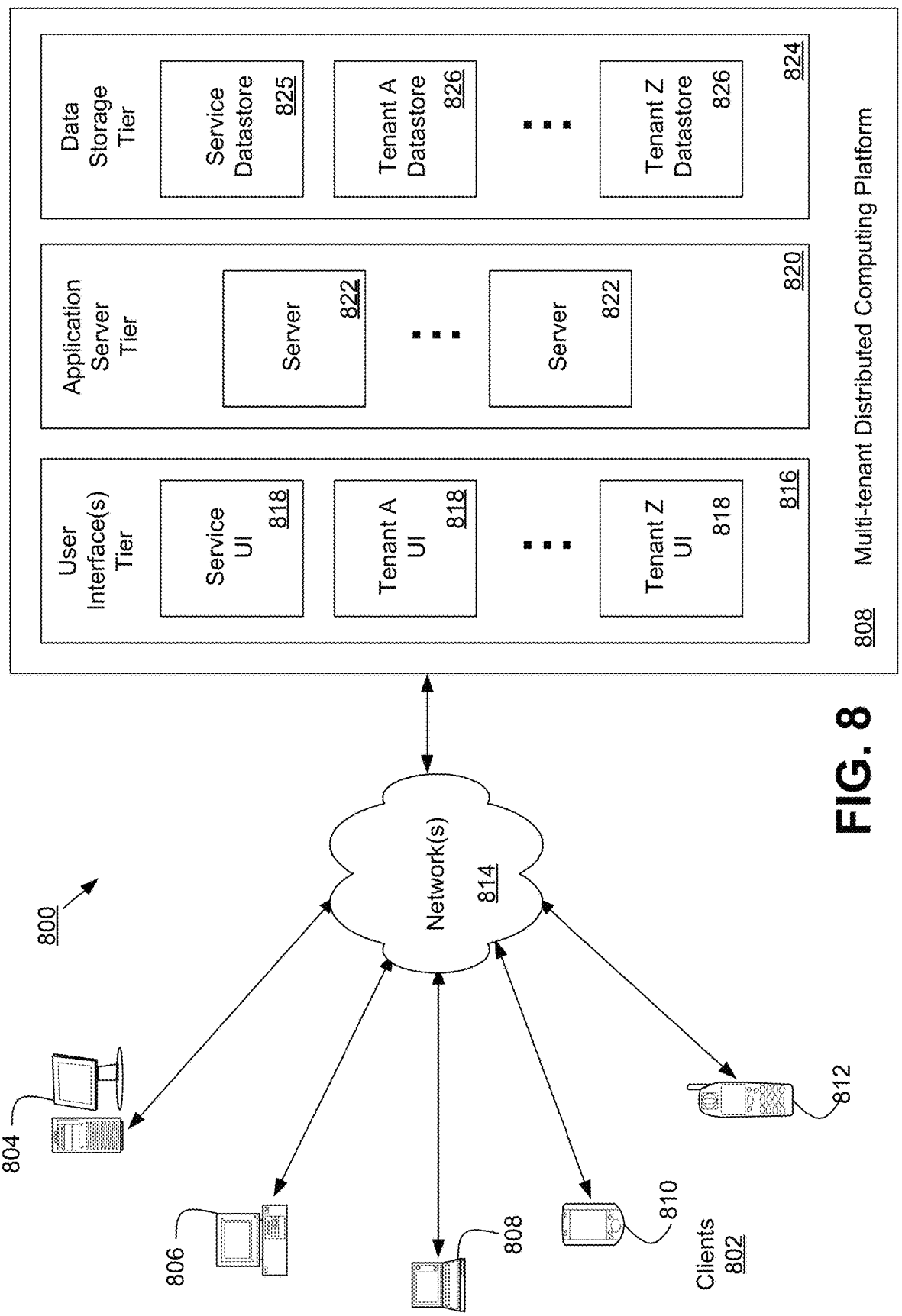
FIG. 8 illustrates an embodiment of a multi-tenant distributed computing service platform.

FIG. 8 is a diagram illustrating elements or components of an example operating environment 800 in which an embodiment of the invention may be implemented. As shown, a variety of clients 802 incorporating and/or incorporated into a variety of computing devices may communicate with a distributed computing service/platform 808 through one or more networks 814. For example, a client may incorporate and/or be incorporated into a client application (e.g., software) implemented at least in part by one or more of the computing devices. Examples of suitable computing devices include personal computers, server computers 804, desktop computers 806, laptop computers 808, notebook computers, tablet computers or personal digital assistants (PDAs) 810, smart phones 812, cell phones, and consumer electronic devices incorporating one or more computing device components, such as one or more electronic processors, microprocessors, central processing units (CPU), or controllers. Examples of suitable networks 814 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 808 may include multiple processing tiers, including a user interface tier 816, an application server tier 820, and a data storage tier 824. The user interface tier 816 may maintain multiple user interfaces 818, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 824 may include one or more data stores, which may include a Service Data store 825 and one or more Tenant Data stores 826.

Each tenant data store 826 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 808 may be multi-tenant and service platform 808 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 822 that are part of the platform's Application Server Tier 820.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 808 of FIG. 8(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 822 that are part of the platform's Application Server Tier 820.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 808 of FIG. 8).

As noted with regards to FIG. 7, the integrated business system shown in FIG. 8 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
    extract features from an image of a location as extracted features, wherein the image includes geo-reference metadata describing geo-locations of objects depicted within the image;
    determine similarities between the extracted features and known features within vector data for the location;
    generate a data structure representing similarities between the extracted features and the known features that exceed a similarity threshold, wherein the data structure is generated by at least generating a graph representing edge connections between one or more of a first set of nodes representing the extracted features and one or more of a second set of nodes representing the known features, wherein the edges are created between the nodes in the first set of nodes and the nodes in the second set of nodes based upon the similarities that exceed the similarity threshold;
    scale the extracted features to create extracted features with same total lengths;
    for an extracted feature, divide lengths of edges of the extracted feature by a total length of the extracted feature;
    process the similarities within the data structure to identify a match between a first extracted feature and a first known feature based upon the first extracted feature having a highest similarity with the first known feature;
    assign geo-location data from the vector data for the first known feature to the first extracted feature;
    identify a position of an object represented by the first extracted feature within the location using the geo-location data; and
    wherein when the image does not comprise geo-reference metadata, geo-location data is determined, generated and assigned as new geo-reference metadata for the image.

2. The non-transitory computer-readable medium of claim 1, wherein the instructions further comprise instructions that when executed by the processor cause the processor to:

perform a turning function algorithm to determine the similarities, wherein performing the turning function for the first known feature and the first extracted feature comprises:
calculating a first set of angles between neighboring edges of the first known feature;
determining a first turning function for the first known feature by summing values within the first set of angles;
calculating a second set of angles between neighboring edges of the first extracted feature;
determining a second turning function for the first extracted feature by summing values within the second set of angles; and
determining the similarity between the first known feature and the first extracted feature based upon a distance between the first turning function and the second turning function.

3. The non-transitory computer-readable medium of claim 1, wherein the instructions comprise instructions to:
create a matrix comprising weight values for connected nodes within the graph, wherein the weight values are derived from the similarities between the connected nodes within the graph; and
process the weight values within the matrix to identify the match between the first extracted feature and the first known feature associated with a weight value below a weight threshold.

4. The non-transitory computer-readable medium of claim 1, wherein the instructions to determine the similarity comprise instructions to:
determine the similarity between the first extracted feature and the first known feature based upon a similarity between a first polygon area of the first extracted feature and a second polygon area of the first known feature.

5. The non-transitory computer-readable medium of claim 1, wherein the instructions to determine the similarity comprise instructions to:
determine the similarity between the first extracted feature and the first known feature based upon a similarity between a first minimum bounding rectangle of the first extracted feature and a second minimum bounding rectangle of the first known feature.

6. The non-transitory computer-readable medium of claim 1, wherein the instructions to determine the similarity comprise instructions to:
determine similarity between the first extracted feature and the first known feature based upon a similarity between a first convex-hull of the first extracted feature and a second convex hull of the first known feature.

7. A computing system, comprising:
a hardware processor connected to memory; and
a geo-referencing module stored on a non-transitory computer readable medium and configured with instructions that when executed by the processor cause the processor to:
extract features from an image of a location as extracted features, wherein the image includes geo-reference metadata describing geo-locations of objects depicted within the image;
determine similarities between the extracted features and known features within vector data for the location;
generate a data structure representing similarities between the extracted features and the known features that exceed a similarity threshold, wherein the data structure is generated to include at least a graph representing edge connections between one or more of a first set of nodes representing the extracted features and one or more of a second set of nodes representing the known features, wherein the edges are created between the nodes in the first set of nodes and the nodes in the second set of nodes based upon the similarities that exceed the similarity threshold;
scale the extracted features to create extracted features with same total lengths;
for an extracted feature, divide lengths of edges of the extracted feature by a total length of the extracted feature;
process the similarities within the data structure to identify a match between a first extracted feature and a first known feature based upon the first extracted feature having a highest similarity with the first known feature;
assign geo-location data from the vector data for the first known feature to the first extracted feature;
identify a position of an object represented by the first extracted feature within the location using the geo-location data; and
wherein when the image does not comprise geo-reference metadata, geo-location data is determined, generated and assigned as new geo-reference metadata for the image.

8. The computing system of claim 7, wherein the instructions to extract features comprise instructions that cause the processor to:
perform binary segmentation upon the image for extracting the extracted features.

9. The computing system of claim 8, wherein the instructions comprise instructions that cause the processor to:
convert the image into a binary image; and
perform the binary segmentation upon the binary image for extracting the extracted features.

10. The computing system of claim 9, wherein the instructions comprise instructions that cause the processor to:
in response to identifying holes in the binary image, fill the holes with values.

11. The computing system of claim 7, wherein the instructions comprise instructions that cause the processor to:
index the vector data for the location using a spatial index function to create indexed vector data.

12. The computing system of claim 7, wherein the instructions cause the processor to:
create a matrix comprising weight values for connected nodes within the graph, wherein the weight values are derived from the similarities between the connected nodes within the graph;
process the weight values within the matrix to identify the match between the first extracted feature and the first known feature associated with a weight value below a weight threshold; and
execute a spatial algorithm upon the matrix to perform minimum cost matching between extracted features and known features.

13. A computer-implemented method, the computer-implemented method involving a computing device comprising a processor, and the computer-implemented method comprising:
extracting, by the processor, features from an image of a location as extracted features, wherein the image comprises geo-reference metadata describing geo-locations of objects depicted within the image;

determining, by the processor, similarities between the extracted features and known features within vector data for the location;

generating, by the processor, a data structure representing similarities between the extracted features and the known features that exceed a similarity threshold, wherein the data structure is generated by at least generating a graph representing edge connections between one or more of a first set of nodes representing the extracted features and one or more of a second set of nodes representing the known features, wherein the edges are created between the nodes in the first set of nodes and the nodes in the second set of nodes based upon the similarities that exceed the similarity threshold;

scaling the extracted features to create extracted features with same total lengths;

for an extracted feature, dividing lengths of edges of the extracted feature by a total length of the extracted feature;

processing, by the processor, the similarities to identify a match between a first extracted feature and a first known feature based upon the first extracted feature having a highest similarity with the first known feature;

modifying, by the processor, the geo-reference metadata for the first extracted feature based upon geo-location data of the first known feature; and wherein when the image does not comprise geo-reference metadata, geo-location data is determined, generated and assigned as new geo-reference metadata for the image.

14. The computer-implemented method of claim 13, wherein the processing of the weight values within the matrix comprises:
creating a matrix comprising weight values for connected nodes within the graph, wherein the weight values are derived from the similarities between the connected nodes within the graph; and
processing the weight values within the matrix to identify the match between the first extracted feature and the first known feature associated with a weight value below a weight threshold.

15. The computer-implemented method of claim 14, wherein the processing of the weight values within the matrix comprises:
for each row in the matrix:
identifying a smallest weight value of a row; and
subtracting the smallest weight value from all of the weight values in the row; and
for each column in the matrix:
identifying a smallest weight value of a column; and
subtracting the smallest weight value from all of the weight values in the column.

16. The computer-implemented method of claim 15, wherein the processing of the weight values within the matrix comprises:
crossing out a minimum number of lines in either a vertical or a horizontal direction of the matrix to remove all zero weight values in the matrix.

17. The computer-implemented method of claim 16, wherein the processing the weights within the matrix comprises:
responsive to the number of crossed out lines being equal to a number of rows or columns, identifying a solution of matches between known features and extracted features based upon a current state of the matrix.

18. The computer-implemented method of claim 17, wherein the processing the weights within the matrix comprises:
responsive to the number of crossed out lines not being equal to the number of rows or columns:
determining a current smallest weight value from all uncrossed weight values in the matrix;
subtracting the current smallest weight value from all uncrossed weight values;
adding the current smallest weight value to weight values crossed by two lines; and
determining whether a current number of crossed out lines are equal to the number of rows or columns in the matrix for identifying the solution of matches between known features and extracted features based upon a current state of the matrix.

* * * * *

UNITED STATES PATENT AND TRADEMARK OFFICE
CERTIFICATE OF CORRECTION

PATENT NO. : 10,896,218 B2
APPLICATION NO. : 15/851840
DATED : January 19, 2021
INVENTOR(S) : Reyes Martinez et al.

Page 1 of 1

It is certified that error appears in the above-identified patent and that said Letters Patent is hereby corrected as shown below:

In the Specification

In Column 3, Line 42, delete "In may" and insert -- It may --, therefor.

In Column 7, Line 4, delete "and or" and insert -- and/or --, therefor.

In Column 10, Line 30, delete "that that" and insert -- that --, therefor.

In the Claims

In Column 25, Line 51, in Claim 6, delete "convex hull" and insert -- convex-hull --, therefor.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*